US012175603B2

(12) United States Patent
Cross et al.

(10) Patent No.: US 12,175,603 B2
(45) Date of Patent: Dec. 24, 2024

(54) DOORS FOR ARTIFICIAL REALITY UNIVERSE TRAVERSAL

(71) Applicant: Meta Platforms Technologies, LLC, Menlo Park, CA (US)

(72) Inventors: Rachel Cross, Foster City, CA (US); Patricia Dooley, Bothell, WA (US); Sarah Barrick, Cupertino, CA (US); Jean Chin, Menlo Park, CA (US); Katerina Vasiliou, Seattle, WA (US); Tiffany Madruga, New York, NY (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 54 days.

(21) Appl. No.: 17/936,498

(22) Filed: Sep. 29, 2022

(65) Prior Publication Data
US 2024/0112409 A1 Apr. 4, 2024

(51) Int. Cl.
*G06T 19/20* (2011.01)
*G06T 19/00* (2011.01)

(52) U.S. Cl.
CPC .......... *G06T 19/003* (2013.01); *G06T 19/006* (2013.01); *G06T 19/20* (2013.01); *G06T 2219/024* (2013.01)

(58) Field of Classification Search
CPC ..... G06T 19/003; G06T 19/006; G06T 19/20; G06T 2219/024; G06F 21/31; G06F 3/011
See application file for complete search history.

(56) References Cited

U.S. PATENT DOCUMENTS 6,842,175 B1  1/2005  Schmalstieg et al.
7,701,439 B2  4/2010  Hillis et al.
(Continued)

FOREIGN PATENT DOCUMENTS

CN   101996077 A   3/2011
EP   3719616 A1  10/2020
(Continued)

OTHER PUBLICATIONS

International Search Report and Written Opinion for International Application No. PCT/US2023/018759, mailed Jun. 14, 2023, 9 pages.
(Continued)

*Primary Examiner* — Jitesh Patel
(74) *Attorney, Agent, or Firm* — Potomac Law Group, PLLC; Dannon G. Allbee

(57) ABSTRACT

Aspects of the present disclosure are directed to creating virtual doors within artificial reality (XR) universes for traversal within that XR universe and between other XR universes. Users can create virtual doors that control access to their privately owned property (e.g., world, parcel, house, etc.) in an XR universe. For example, an owner of a virtual door can manually lock the door to prevent any user from entering their property through the virtual door. As another example, an owner of a virtual door can configure door permissions and/or privacy settings that serve as heuristics by which a door access control manager determines whether to authorize a particular user, XR world, and/or XR universe to access. The XR universe traversal system can control an execution environment to smoothly transition between different applications, thereby enabling a user to traverse between different XR universes without having to leave the XR environment.

20 Claims, 18 Drawing Sheets

(56) References Cited

U.S. PATENT DOCUMENTS

| | | | |
|---|---|---|---|
| 8,424,075 B1 * | 4/2013 | Walsh | H04L 63/0263 726/14 |
| D683,749 S | 6/2013 | Hally | |
| D689,874 S | 9/2013 | Brinda et al. | |
| 8,947,351 B1 | 2/2015 | Noble | |
| D726,219 S | 4/2015 | Chaudhri et al. | |
| D727,352 S | 4/2015 | Ray et al. | |
| D727,354 S | 4/2015 | Park et al. | |
| D733,740 S | 7/2015 | Lee et al. | |
| 9,117,274 B2 | 8/2015 | Liao et al. | |
| 9,292,089 B1 | 3/2016 | Sadek | |
| D761,273 S | 7/2016 | Kim et al. | |
| D763,279 S | 8/2016 | Jou | |
| 9,477,368 B1 | 10/2016 | Filip et al. | |
| D775,179 S | 12/2016 | Kimura et al. | |
| D775,196 S | 12/2016 | Huang et al. | |
| D780,794 S | 3/2017 | Kisielius et al. | |
| D781,905 S | 3/2017 | Nakaguchi et al. | |
| D783,037 S | 4/2017 | Hariharan et al. | |
| D784,394 S | 4/2017 | Laing et al. | |
| D784,395 S | 4/2017 | Laing et al. | |
| D787,527 S | 5/2017 | Wilberding | |
| D788,136 S | 5/2017 | Jaini et al. | |
| D788,793 S | 6/2017 | Ogundokun et al. | |
| D789,416 S | 6/2017 | Baluja et al. | |
| D789,977 S | 6/2017 | Mijatovic et al. | |
| D790,567 S | 6/2017 | Su et al. | |
| D791,823 S | 7/2017 | Zhou | |
| D793,403 S | 8/2017 | Cross et al. | |
| 9,817,472 B2 | 11/2017 | Lee et al. | |
| D817,994 S | 5/2018 | Jou | |
| D819,065 S | 5/2018 | Xie et al. | |
| D824,951 S | 8/2018 | Kolbrener et al. | |
| D828,381 S | 9/2018 | Lee et al. | |
| D829,231 S | 9/2018 | Hess et al. | |
| D831,681 S | 10/2018 | Eilertsen | |
| D835,665 S | 12/2018 | Kimura et al. | |
| 10,168,768 B1 | 1/2019 | Kinstner | |
| D842,889 S | 3/2019 | Krainer et al. | |
| 10,220,303 B1 | 3/2019 | Schmidt et al. | |
| 10,248,284 B2 | 4/2019 | Itani et al. | |
| D848,474 S | 5/2019 | Baumez et al. | |
| D850,468 S | 6/2019 | Malahy et al. | |
| D851,123 S | 6/2019 | Turner | |
| D853,431 S | 7/2019 | Sagrillo et al. | |
| D854,551 S | 7/2019 | Pistiner et al. | |
| D856,366 S | 8/2019 | Richardson | |
| D859,426 S | 9/2019 | Poes | |
| 10,473,935 B1 | 11/2019 | Gribetz et al. | |
| 10,521,944 B2 | 12/2019 | Sareen et al. | |
| 10,592,064 B2 | 3/2020 | Ames et al. | |
| 10,665,019 B2 | 5/2020 | Hildreth et al. | |
| D888,071 S | 6/2020 | Wilberding | |
| D900,123 S | 10/2020 | Lopes | |
| D908,713 S | 1/2021 | Fremine et al. | |
| D910,655 S | 2/2021 | Matthewman et al. | |
| D910,660 S | 2/2021 | Chaturvedi et al. | |
| 10,916,220 B2 | 2/2021 | Ngo | |
| 10,948,997 B1 | 3/2021 | Victor-Faichney et al. | |
| 10,987,573 B2 | 4/2021 | Nietfeld et al. | |
| 11,086,476 B2 | 8/2021 | Inch et al. | |
| 11,164,378 B1 | 11/2021 | Cowen et al. | |
| 11,380,021 B2 | 7/2022 | Nakata | |
| 11,520,707 B2 | 12/2022 | Satpathy et al. | |
| 11,556,169 B2 | 1/2023 | Wallen et al. | |
| 11,556,220 B1 | 1/2023 | Inch et al. | |
| 11,676,351 B1 * | 6/2023 | Yang | G06T 17/20 345/419 |
| 11,755,180 B1 | 9/2023 | Edelblut et al. | |
| 11,836,205 B2 | 12/2023 | Inch et al. | |
| 11,928,314 B2 | 3/2024 | Edelblut et al. | |
| 2002/0073043 A1 | 6/2002 | Herman et al. | |
| 2005/0060661 A1 | 3/2005 | Kawahara et al. | |
| 2008/0089587 A1 | 4/2008 | Kim et al. | |
| 2008/0155118 A1 | 6/2008 | Glaser et al. | |
| 2009/0103780 A1 | 4/2009 | Nishihara et al. | |
| 2009/0279784 A1 | 11/2009 | Arcas et al. | |
| 2010/0005424 A1 | 1/2010 | Sundaresan et al. | |
| 2010/0050219 A1 | 2/2010 | Angiolillo et al. | |
| 2010/0083112 A1 * | 4/2010 | Dawson | G06Q 10/00 715/706 |
| 2010/0169837 A1 | 7/2010 | Hyndman | |
| 2010/0208033 A1 | 8/2010 | Edge et al. | |
| 2010/0306716 A1 | 12/2010 | Perez | |
| 2010/0332996 A1 | 12/2010 | Sarkaria | |
| 2010/0332997 A1 | 12/2010 | Hamilton, II et al. | |
| 2011/0055090 A1 | 3/2011 | Ross | |
| 2011/0161843 A1 | 6/2011 | Bennett et al. | |
| 2011/0164269 A1 * | 7/2011 | Kamishiro | G06F 21/31 358/1.13 |
| 2011/0267265 A1 | 11/2011 | Stinson | |
| 2011/0276477 A1 | 11/2011 | Shuster | |
| 2011/0302535 A1 | 12/2011 | Clerc et al. | |
| 2012/0069168 A1 | 3/2012 | Huang et al. | |
| 2012/0115122 A1 | 5/2012 | Bruce et al. | |
| 2012/0143358 A1 | 6/2012 | Adams et al. | |
| 2012/0206345 A1 | 8/2012 | Langridge | |
| 2012/0249797 A1 | 10/2012 | Haddick et al. | |
| 2012/0275686 A1 | 11/2012 | Wilson et al. | |
| 2012/0293544 A1 | 11/2012 | Miyamoto et al. | |
| 2013/0044128 A1 | 2/2013 | Liu et al. | |
| 2013/0063345 A1 | 3/2013 | Maeda | |
| 2013/0125066 A1 | 5/2013 | Klein et al. | |
| 2013/0141428 A1 * | 6/2013 | Gipson | G06F 3/04815 345/419 |
| 2013/0147793 A1 | 6/2013 | Jeon et al. | |
| 2013/0178257 A1 * | 7/2013 | Langseth | A63F 13/23 345/419 |
| 2013/0179761 A1 | 7/2013 | Cho et al. | |
| 2013/0265220 A1 | 10/2013 | Fleischmann et al. | |
| 2014/0019609 A1 | 1/2014 | Williams et al. | |
| 2014/0037218 A1 | 2/2014 | Zweig et al. | |
| 2014/0125598 A1 | 5/2014 | Cheng et al. | |
| 2014/0200084 A1 | 7/2014 | Butler et al. | |
| 2014/0236996 A1 | 8/2014 | Masuko et al. | |
| 2014/0316990 A1 | 10/2014 | Winston | |
| 2015/0035746 A1 | 2/2015 | Cockburn et al. | |
| 2015/0054742 A1 | 2/2015 | Imoto et al. | |
| 2015/0062160 A1 | 3/2015 | Sakamoto et al. | |
| 2015/0153833 A1 | 6/2015 | Pinault et al. | |
| 2015/0160736 A1 | 6/2015 | Fujiwara | |
| 2015/0169076 A1 | 6/2015 | Cohen et al. | |
| 2015/0179147 A1 | 6/2015 | Rezaiifar et al. | |
| 2015/0181679 A1 | 6/2015 | Liao et al. | |
| 2015/0206321 A1 | 7/2015 | Scavezze et al. | |
| 2015/0220150 A1 | 8/2015 | Plagemann et al. | |
| 2015/0261659 A1 | 9/2015 | Bader et al. | |
| 2015/0293666 A1 | 10/2015 | Lee et al. | |
| 2015/0371441 A1 | 12/2015 | Shim | |
| 2016/0044298 A1 | 2/2016 | Holz et al. | |
| 2016/0062618 A1 | 3/2016 | Fagan et al. | |
| 2016/0110052 A1 | 4/2016 | Kim et al. | |
| 2016/0147308 A1 | 5/2016 | Gelman et al. | |
| 2016/0378291 A1 | 12/2016 | Pokrzywka | |
| 2017/0003750 A1 | 1/2017 | Li | |
| 2017/0031503 A1 | 2/2017 | Rosenberg et al. | |
| 2017/0039770 A1 | 2/2017 | Lanier et al. | |
| 2017/0060230 A1 | 3/2017 | Faaborg et al. | |
| 2017/0109936 A1 | 4/2017 | Powderly et al. | |
| 2017/0139478 A1 | 5/2017 | Jeon et al. | |
| 2017/0192513 A1 | 7/2017 | Karmon et al. | |
| 2017/0236196 A1 | 8/2017 | Isaacson et al. | |
| 2017/0236320 A1 | 8/2017 | Gribetz et al. | |
| 2017/0237789 A1 | 8/2017 | Harner et al. | |
| 2017/0262063 A1 | 9/2017 | Blénessy et al. | |
| 2017/0278304 A1 | 9/2017 | Hildreth et al. | |
| 2017/0287225 A1 | 10/2017 | Powderly et al. | |
| 2017/0296363 A1 | 10/2017 | Yetkin et al. | |
| 2017/0308608 A1 * | 10/2017 | Freeman | G06F 16/95 |
| 2017/0316606 A1 | 11/2017 | Khalid et al. | |
| 2017/0336951 A1 | 11/2017 | Palmaro | |
| 2017/0364198 A1 | 12/2017 | Yoganandan et al. | |
| 2018/0024623 A1 | 1/2018 | Faaborg et al. | |
| 2018/0040044 A1 | 2/2018 | Mattingly et al. | |

(56) References Cited

U.S. PATENT DOCUMENTS

| | | |
|---|---|---|
| 2018/0053351 A1 | 2/2018 | Anderson |
| 2018/0059901 A1 | 3/2018 | Gullicksen |
| 2018/0059902 A1 | 3/2018 | Martin |
| 2018/0098059 A1 | 4/2018 | Valdivia et al. |
| 2018/0107278 A1 | 4/2018 | Goel et al. |
| 2018/0113599 A1 | 4/2018 | Yin |
| 2018/0143757 A1 | 5/2018 | Champion et al. |
| 2018/0144556 A1 | 5/2018 | Champion et al. |
| 2018/0207522 A1 | 7/2018 | Roman et al. |
| 2018/0307303 A1 | 10/2018 | Powderly et al. |
| 2018/0322674 A1 | 11/2018 | Du |
| 2018/0322701 A1 | 11/2018 | Pahud et al. |
| 2018/0335925 A1 | 11/2018 | Hsiao et al. |
| 2018/0342106 A1 | 11/2018 | Rosado |
| 2018/0349690 A1 | 12/2018 | Rhee et al. |
| 2018/0361258 A1 | 12/2018 | Malyuk |
| 2019/0005716 A1 | 1/2019 | Singh et al. |
| 2019/0026936 A1 | 1/2019 | Gorur Sheshagiri et al. |
| 2019/0035152 A1 | 1/2019 | Kazansky |
| 2019/0065027 A1 | 2/2019 | Hauenstein et al. |
| 2019/0088030 A1 | 3/2019 | Masterson et al. |
| 2019/0094981 A1 | 3/2019 | Bradski et al. |
| 2019/0107894 A1 | 4/2019 | Hebbalaguppe et al. |
| 2019/0121522 A1 | 4/2019 | Davis et al. |
| 2019/0139321 A1 | 5/2019 | Kocharlakota et al. |
| 2019/0197780 A1 | 6/2019 | Rao |
| 2019/0213792 A1 | 7/2019 | Jakubzak et al. |
| 2019/0258318 A1 | 8/2019 | Qin et al. |
| 2019/0278376 A1 | 9/2019 | Kutliroff et al. |
| 2019/0279424 A1 | 9/2019 | Clausen et al. |
| 2019/0286231 A1 | 9/2019 | Burns et al. |
| 2019/0287307 A1 | 9/2019 | Rogers et al. |
| 2019/0295101 A1 | 9/2019 | Porter et al. |
| 2019/0302895 A1 | 10/2019 | Jiang et al. |
| 2019/0304166 A1 | 10/2019 | Yu et al. |
| 2019/0306137 A1 | 10/2019 | Isaacson et al. |
| 2019/0310757 A1 | 10/2019 | Lee et al. |
| 2019/0340818 A1 | 11/2019 | Furtwangler |
| 2019/0347762 A1 | 11/2019 | Hwang et al. |
| 2019/0362562 A1 | 11/2019 | Benson |
| 2019/0377416 A1 | 12/2019 | Alexander |
| 2019/0385372 A1 | 12/2019 | Cartwright et al. |
| 2020/0020165 A1 | 1/2020 | Tran et al. |
| 2020/0050289 A1 | 2/2020 | Hardie-Bick et al. |
| 2020/0051527 A1 | 2/2020 | Ngo |
| 2020/0089390 A1 | 3/2020 | Bakhash |
| 2020/0097077 A1 | 3/2020 | Nguyen et al. |
| 2020/0097091 A1 | 3/2020 | Chou et al. |
| 2020/0111260 A1 | 4/2020 | Osborn et al. |
| 2020/0151965 A1 | 5/2020 | Forbes et al. |
| 2020/0193649 A1 | 6/2020 | Moon et al. |
| 2020/0218342 A1 | 7/2020 | Murali et al. |
| 2020/0225736 A1 | 7/2020 | Schwarz et al. |
| 2020/0225758 A1 | 7/2020 | Tang et al. |
| 2020/0226814 A1 | 7/2020 | Tang et al. |
| 2020/0241730 A1 | 7/2020 | DiVerdi et al. |
| 2020/0245017 A1 | 7/2020 | Ganschow et al. |
| 2020/0258278 A1 | 8/2020 | Mirhosseini et al. |
| 2020/0279044 A1 | 9/2020 | Lum et al. |
| 2020/0293178 A1 | 9/2020 | Kumar et al. |
| 2020/0294097 A1 | 9/2020 | Spivack et al. |
| 2020/0320794 A1 | 10/2020 | Huang et al. |
| 2020/0401687 A1 | 12/2020 | Mak |
| 2021/0005022 A1 | 1/2021 | Oser et al. |
| 2021/0011556 A1 | 1/2021 | Atlas et al. |
| 2021/0089639 A1 | 3/2021 | Remillet et al. |
| 2021/0090333 A1 | 3/2021 | Ravasz et al. |
| 2021/0103447 A1 | 4/2021 | Wei et al. |
| 2021/0124475 A1 | 4/2021 | Inch et al. |
| 2021/0168324 A1 | 6/2021 | Ngo |
| 2021/0201029 A1* | 7/2021 | Ju ................... G06Q 30/0185 |
| 2021/0252392 A1 | 8/2021 | Stevens |
| 2021/0271370 A1 | 9/2021 | Williams et al. |
| 2021/0343182 A1 | 11/2021 | Lu |
| 2021/0375065 A1 | 12/2021 | Cannefax et al. |
| 2021/0398095 A1 | 12/2021 | Mallett et al. |
| 2022/0036447 A1 | 2/2022 | Spivack et al. |
| 2022/0207830 A1 | 6/2022 | Allen et al. |
| 2022/0254114 A1 | 8/2022 | Frederick et al. |
| 2022/0292543 A1 | 9/2022 | Henderson |
| 2022/0308716 A1 | 9/2022 | Rice |
| 2022/0387873 A1 | 12/2022 | Hall et al. |
| 2022/0414487 A1 | 12/2022 | Si et al. |
| 2023/0092103 A1 | 3/2023 | Puyol et al. |
| 2023/0120052 A1 | 4/2023 | Wallen et al. |
| 2023/0152936 A1 | 5/2023 | Inch et al. |
| 2023/0171438 A1* | 6/2023 | Liu ................... H04N 21/2187 725/37 |
| 2023/0245350 A1 | 8/2023 | Webber et al. |
| 2023/0325896 A1 | 10/2023 | Luker |
| 2023/0419617 A1 | 12/2023 | Krenn et al. |
| 2023/0419618 A1 | 12/2023 | Krenn et al. |
| 2024/0061545 A1 | 2/2024 | Gu et al. |
| 2024/0070215 A1 | 2/2024 | Inch et al. |
| 2024/0073489 A1 | 2/2024 | Hopmann |
| 2024/0160337 A1 | 5/2024 | Edelblut et al. |

FOREIGN PATENT DOCUMENTS

| | | |
|---|---|---|
| JP | 2001325616 A | 11/2001 |
| JP | 2009140294 A | 6/2009 |
| JP | 2014071498 A | 4/2014 |
| JP | 2018109835 A | 7/2018 |
| KR | 20170126362 A | 11/2017 |
| WO | 2022006661 A1 | 1/2022 |
| WO | 2022170222 A1 | 8/2022 |

OTHER PUBLICATIONS

International Search Report and Written Opinion for International Application No. PCT/US2023/025680, mailed Sep. 8, 2023, 11 pages.

David H., "Oculus Developer Hub can now Launch WebXR URLs on Your Quest," uploadvr.com, Dec. 4, 2021, 2 pages, Retrieved from the Internet: https://web.archive.org/web/20211204181804/https://www.uploadvr.com/oculus-developer-hub-web-urls-metrics/.

International Search Report and Written Opinion for International Application No. PCT/US2023/025685, mailed Oct. 5, 2023, 9 pages.

International Search Report and Written Opinion for International Application No. PCT/US2023/030469, mailed Nov. 20, 2023, 12 pages.

International Search Report and Written Opinion for International Application No. PCT/US2023/032524, mailed Nov. 16, 2023, 9 pages.

Oculus VR., "Oculus Developer Hub Update 1.8," Oculus, 5 p. Jun. 22, 2021, Retrieved from the Internet: https://web.archive.org/web/20210622003501/https://developer.oculus.com/blog/oculus-developer-hub-update-18/.

Chen Y., et al., "Object Modeling by Registration of Multiple Range Images," Proceedings of the 1991 IEEE International Conference on Robotics and Automation, Apr. 1991, pp. 2724-2729, Retrieved from the internet: URL: https://graphics.stanford.edu/courses/cs348a-17-winter/Handouts/chen-medioni-align-rob91.pdf.

Foxman M., et al., "United We Stand: Platforms, Tools and Innovation with the Unity Game Engine," Social Media Society, Nov. 21, 2019, 10 pages.

Hincapie-Ramos J.D., et aL, "GyroWand: IMU-Based Raycasting for Augmented Reality Head-Mounted Displays," Proceedings of the 3rd Association for Computing Machinery (ACM) Symposium on Spatial User Interaction, Los Angeles, Ca, USA, Aug. 8-9, 2015, pp. 89-98.

International Preliminary Report on Patentability for International Application No. PCT/US2020/052976, mailed May 5, 2022, 9 pages.

International Search Report and Written Opinion for International Application No. PCT/US2020/052976, mailed Dec. 11, 2020, 10 Pages.

(56) References Cited

OTHER PUBLICATIONS

International Search Report and Written Opinion for International Application No. PCT/US2021/064674, mailed Apr. 19, 2022, 13 pages.
International Search Report and Written Opinion for International Application No. PCT/US2022/016110, mailed Apr. 29, 2022, 12 pages.
International Search Report and Written Opinion for International Application No. PCT/US2023/017413, mailed Jul. 4, 2023, 12 pages.
Katz N., et al., "Extending Web Browsers with a Unity 3D-Based Virtual Worlds Viewer," IEEE Computer Society, Sep./Oct. 2011, vol. 15 (5), pp. 15-21.
Mayer S., et aL, "The Effect of Offset Correction and Cursor on Mid-Air Pointing in Real and Virtual Environments," Proceedings of the 2018 CHI Conference on Human Factors in Computing Systems, Montreal, QC, Canada, Apr. 21-26, 2018, pp. 1-13.
Milborrow S., "Active Shape Models with Stasm," [Retrieved on Sep. 20, 2022], 3 pages, Retrieved from the internet: URL: http://www.milbo.users.sonic.net/stasm/.
Milborrow S., et al., "Active Shape Models with SIFT Descriptors and Mars," Department of Electrical Engineering, 2014, 8 pages, Retrieved from the internet: URL: http://www.milbo.org/stasm-files/active-shape-models-with-sift-and-mars.pdf.
MRPT: "RANSAC C++ Examples," 2014, 6 pages, Retrieved from the internet: URL: https://www.mrpt.org/tutorials/programming/maths-and-geometry/ransac-c-examples/.
Office Action mailed Nov. 8, 2023 for European Patent Application No. 20789416.3, filed on Sep. 27, 2020, 4 pages.
Office Action mailed Mar. 14, 2024 for Chinese Application No. 202080057590.5, filed Sep. 27, 2020, 9 pages.
Olwal A., et al., "The Flexible Pointer: An Interaction Technique for Selection in Augmented and Virtual Reality," Proceedings of ACM Symposium on User Interface Software and Technology (UIST), Vancouver, BC, Nov. 2-5, 2003, pp. 81-82.
Orland K., "So What is the "Metaverse," Exactly?," ars Technica, Dec. 7, 2021 [Retrieved on Jun. 16, 2023], pp. 1-14, Retrieved from the Internet: https://web.archive.Org/web/20220407114023/https://arstechnica.com/gaming/2021/11/everyone-pitching-the-metaverse-has-a-different-idea-of-what-it-is/.
Qiao X., et al., "Web AR: A Promising Future for Mobile Augmented Reality—State of the Art. Challenges, and Insights," Proceedings of the IEEE, Apr. 2019, vol. 107 (4), pp. 651-666.
Renner P., et al., "Ray Casting", Central Facility Labs [Online], [Retrieved on Apr. 7, 2020], 2 pages, Retrieved from the Internet: URL:https://www.techfak.uni-bielefeld.de/~tpfeiffe/lehre/VirtualReality/interaction/ray_casting.html.
Schweigert R., et aL, "EyePointing: A Gaze-Based Selection Technique," Proceedings of Mensch and Computer, Hamburg, Germany, Sep. 8-11, 2019, pp. 719-723.
Srinivasa R.R., "Augmented Reality Adaptive Web Content," 13th IEEE Annual Consumer Communications & Networking Conference (CCNC), 2016, pp. 1-4.
Trademark Application Serial No. 73289805, filed Dec. 15, 1980,1 page.
Trademark Application Serial No. 73560027, filed Sep. 25, 1985,1 page.
Trademark Application Serial No. 74155000, filed Apr. 8, 1991,1 page.
Trademark Application Serial No. 76036844, filed Apr. 28, 2000,1 page.
Unity Gets Toolkit for Common AR/VR Interactions, Unity XR interaction Toolkit Preview [Online], Dec. 19, 2019 Retrieved on Apr. 7, 2020], 1 page, Retrieved from the Internet: URL: http://youtu.be/ZPhv4qmT9EQ.
Webxr: "WebXR Device API Explained," Aug. 23, 2021, 31 pages, Retrieved from the Internet URL: https://web.archive.Org/web/20210823211837/https://immersive-web.github.io/webxr/explainer.html#objectdata-visualization.
Whitton M., et al., "Integrating Real and Virtual Objects in Virtual Environments," Aug. 24, 2007, Retrieved from http://web.archive.org/web/20070824035829/ http://www.cs.unc.edu/~whitton/ExtendedCV/Papers/2005-HCII-Whitton-MixedEnvs.pdf, on May 3, 2017, 10 pages.
Wikipedia: "Canny Edge Detector," [Retrieved on Sep. 20, 2022], 10 pages, Retrieved from the internet: URL: https://en.wi ki pedia.org/wi ki/Canny_edge_detector.
Wikipedia: "Iterative Closest Point," [Retrieved on Sep. 20, 2022], 3 pages, Retrieved from the internet: URL: https://en.wikipedia.org/wiki/Iterative_closest_point.
YouTube: "V1 VR NFT Art Gallery is Live! OnCyber.xyz/ArtisMyWeapon," Art is My Weapon, Jan. 19, 2022, 2 pages, Retrieved from the Internet URL: https://www.youtube.com/watch?v=BMfLjrkpGb0.
Office Action mailed Jul. 30, 2024 for Japanese Patent Application No. 2022-500566, filed on Sep. 27, 2020, 7 pages.

\* cited by examiner

DOORS FOR ARTIFICIAL REALITY UNIVERSE TRAVERSAL

TECHNICAL FIELD

The present disclosure is directed to providing virtual doors within artificial reality (XR) universes for traversal within that XR universe and between other XR universes and experiences.

BACKGROUND

Users interacting with artificial reality (XR) devices can view content in an artificial reality environment that includes real-world objects and/or two-dimensional (2D) and/or three-dimensional (3D) virtual objects. For example, the artificial reality environment can be a virtual environment depicted by a virtual reality (VR) device showing a set of virtual objects. As another example, the artificial reality environment can a mixed reality environment with real-world objects and virtual objects supplemented over the real-world objects. A user can view the objects in the artificial reality environment and modify content in the artificial reality environment.

A whole virtual world, or virtual land within an XR world that can be divided up into parcels and allocated, can be owned by different users. In some cases, one user can own a parcel that is nearby other users (e.g., within a virtual city). Users within that XR world can navigate through the environment and visit virtual properties constructed and maintained by other users. Typically, access to virtual world or a user's property in an XR world or universe is unrestricted, allowing users to freely navigate between and view others' virtual properties.

In addition, accessing a given XR experience typically involves launching a web application or native application, which can retrieve assets from servers and/or blockchains and render a portion of an XR experience within some proximity of the user's avatar. Accordingly, switching between XR experiences typically involves exiting the current XR experience application, launching a separate application, and logging into that XR experience application—which can be inconvenient, cumbersome, and break the user's immersion within the XR environment.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
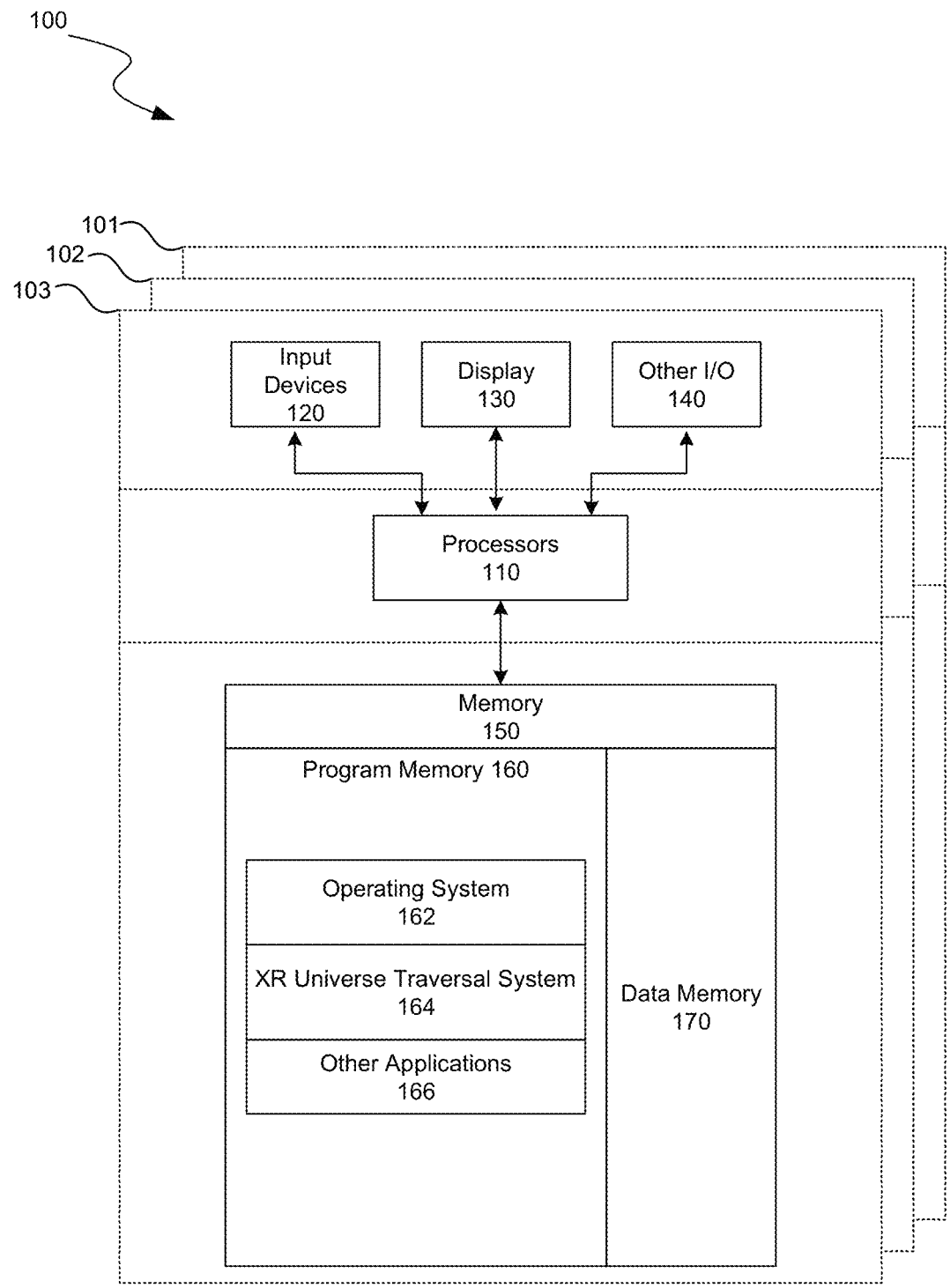
FIG. 1 is a block diagram illustrating an overview of devices on which some implementations of the present technology can operate.

Aspects of the present disclosure are directed to providing virtual doors within artificial reality (XR) universes for traversal within that XR universe and between other XR universes and experiences. An XR universe traversal system can facilitate the creation of, access to, and interoperability of virtual doors that serve as shortcuts, portals, or gateways between different locations within an XR universe and/or between different XR universes. Users can create virtual doors that control access to their privately owned property (e.g., world or parcel within a world) in an XR universe. For example, a creator of a virtual world can define rules for which doors can link to that world and where doors created in that world can lead. As a further example, an owner of a virtual door can manually lock the door to prevent any user from entering their property through the virtual door. As another example, an owner of a virtual door can configure door permissions and/or privacy settings that serve as heuristics by which a door access control manager determines whether to authorize a particular user, XR world, and/or XR universe to access (e.g., based on a user friend list, a user allow list, a user block list, XR world allow list, XR world block list, limits on the number of visitors at a given time, etc.).

In some examples, a user, group of users, or entity (the "owner") can create and maintain an XR world within an XR universe. The owner of that XR world can specify policies or privacy preferences for users visiting that world are permitted to create new virtual doors and/or are permitted to access existing virtual doors going to or from that XR world. For instance, an XR world owner can configure a creation policy that defines which user(s) can and cannot create new virtual doors within their world, the types of XR worlds to which new virtual doors can be created (e.g., worlds of the same or similar type, worlds having a rating that meets or exceeds a threshold rating, etc.), and/or possible limitations on the creation of new virtual doors. Similarly, an XR world owner can configure an access policy that defines which user(s) can and cannot access virtual doors within their world, specific time periods during which users can and cannot access virtual doors within their world, specific time periods during which users can and cannot access their world via other virtual doors, and/or other possible limitations on the use of virtual doors connecting the virtual world to other virtual worlds.

Virtual doors can also allow users to traverse between an XR world (e.g., a shared XR environment, often as an open world experience) and an XR experience (e.g., an XR application that one or more users can view or participate in, such as an XR game, XR simulation, XR movie, or some other XR experience). For instance, one or more users who are gathered in an XR world may enter a virtual door in that world to play a multiplayer XR game together. The XR experience may provide a similar mechanism—such as a virtual door, a menu, or some other user interface—to allow the one or more users to return back to the origin XR world. In this manner, virtual doors can allow users to switch between different XR experiences without leaving the XR environment.

In some implementations, an owner of a virtual door can mint keys that provide access to a virtual door to particular users. An XR universe traversal system can interface with services and/or data stores external to XR universe to facilitate the creation of door keys. For example, an XR universe traversal system can interface with a blockchain to mint new non-fungible tokens (NFTs) that are transferred into a particular user's cryptocurrency wallet. When the recipient of the NFT key wishes to travel to the user's property via the virtual door, the recipient can authenticate themselves and demonstrate proof of ownership of the door key to "unlock" the virtual door. In this manner, keys to virtual doors can be managed as assets independent of any particular XR universe, thereby preventing potential manipulation by the XR universe application and enabling interoperable access to virtual keys across different XR universes.

In some embodiments, an XR universe traversal system may be implemented as a set of features within a particular XR universe to facilitate intra-universe traversal. In these embodiments, the XR universe traversal system may provide convenient tools and/or user interfaces (UIs) that allow users to create new virtual doors and link them to particular destinations, such that the user's property can serve as a hub or gateway to multiple destinations within the XR universe that the user frequently travels to (e.g., marketplaces, entertainment, properties of friends, etc.). If the user wishes to create a new virtual door that is connected to a location within a privately-owned parcel or world within the XR universe, the system can facilitate authorization by the owner of the destination parcel to create the new virtual door (e.g., if the owner of the destination world or parcel has configured their virtual door permissions to require explicit authorization by the owner). Such tools for creating and authorizing the creation of virtual doors can enable non-technical users to implement convenient fast travel shortcuts without needing to design and upload a virtual object (e.g., an artifact, canvas, etc.) to their virtual property, and without needing to understand any particular SDK, API, URI schema, or other technical method of creating interactable objects that teleport a user's avatar to a particular destination.

In some embodiments, an XR universe traversal system can facilitate the creation and use of virtual doors that connect different XR universes and/or experiences for inter-universe and inter-experience traversal. In an example implementation, a host server can provide a virtual door controller that provides interoperable communication between different XR universes, where each XR universe separately implements a digital interface for external requests to create virtual doors within that respective XR universe. For instance, two different XR universes can each provide API endpoints for creating and linking virtual doors in each respective universe. When a user in a first XR universe requests the XR universe traversal system to create a virtual door to a second XR universe, the XR universe traversal system can perform a sequence of operations (e.g., API function calls to each universe server) that cause each respective XR universe to instantiate and link the virtual doors. When a user enters one of the virtual doors, the XR universe traversal system can cause the user's XR system or computing device to open a separate XR application (e.g., web application, containerized application, native application, etc.) with metadata that instructs the newly-opened XR application to log the user into that XR application's universe and position that user's avatar at or near the corresponding door in that XR universe. As another example, if a user enters a virtual door linked to an XR experience associated with an XR application stored on (or downloadable to) the user's device, the virtual door controller can cause the user's device to launch that XR application and automatically context switch to it, such that the user traverses from one XR experience to another without necessarily entering a different XR universe. In this manner, the XR universe traversal system can allow users to rapidly "hop" between XR universes or experiences without having to manually exit the current XR application, launch a separate XR application, log in to the destination XR universe, and navigate to the desired location within that XR universe.

In some cases, an XR universe may be accessed by users within a web browser. In such cases, the XR universe traversal system can control aspects of the web browser to facilitate a smooth transition between different web applications, such as performing HTTPS requests, launching URLs/URIs, facilitating authentication via authentication services, and/or by leveraging browser plugins (e.g., plugins linked to a user's cryptocurrency wallet, plugins that enhance 3D graphics rendering, plugins for managing user credentials and/or passwords, plugins that interface with the XR universe traversal system, etc.). A web browser can act as a runtime environment or virtual machine within which XR universe applications can be executed (e.g., using WebGL™, WebXR, WebAssembly, etc.), and can further facilitate communication between each web application (e.g., using inter-process communication (IPC), cookies, Broadcast Channel APIs, service workers, etc.). For XR universes that rely on blockchain-based authentication, browser plugins can provide access to a user's blockchain wallet(s) to facilitate logging into a given XR universe.

As a specific example, a user directs their avatar in a first XR universe to walk through a virtual door linked to a location in a second XR universe. Upon interacting with the door, the first XR application retrieves metadata and/or other information indicative of the destination XR universe and destination location within that XR universe (e.g., a deep link encoding the XR universe and destination within it). The XR universe traversal system can parse the information about the destination universe and launch a new browser tab or window to open the XR web application for the destination XR universe on the user's computer. The XR universe traversal system can retrieve additional information such as user credentials from a wallet or password manager, a stored session token indicative of a recent authentication, and/or other authenticating information to facilitate logging the user into the destination XR universe. Upon entering the XR universe, the XR universe traversal system can instruct the newly-opened XR application to update the user's avatar location in that XR universe to the destination location associated with the virtual door. Some or all of these steps can be performed in the background while the user remains in the origin XR universe, such that the user experiences only a momentary disruption when traversing across XR universes. Aspects of the virtual door's animation and function can aid in maintaining user immersion, such as by presenting a loading screen, by placing the user in an environment that obscures the loading, and/or using strategic user experience design elements (e.g., a waiting room, elevator, a warp animation, etc.).

In some cases, an XR universe may be accessed by users within a native application of a computing device, such as a laptop or XR headset. XR applications may be executed natively, within a containerized environment (e.g., OS-level virtualization), and/or within a virtual machine. Regardless of the execution environment, the XR universe traversal system can facilitate the transition between and/or communication between XR applications that interact with different XR environments. For example, the XR universe traversal system can launch XR applications (e.g., execute a script, spin up a container, etc.) in the background and prepare the user's avatar in the destination XR universe while the user remains in the original XR universe. If the user does not have the requisite XR application for the destination XR universe installed on their device, the XR universe traversal system can download and install the destination XR universe's application in the background, which may be beneficial when a user wishes to explore new universes. Once the destination XR universe application is ready and the user's avatar at the destination XR universe is positioned at the corresponding virtual door, the XR universe traversal system can cause the user's device to switch applications, thereby giving the user the effect of "hopping" to a new universe.

In some implementations, an XR universe application may implement a framework and/or interface with an external service or plugin for instantiating applications and/or web browsers within the XR universe. Within an operating system, an embedded application or browser may execute on a separate thread, browser, or container, which runs in parallel with the current XR universe application. The XR universe traversal system can leverage such a runtime environment to launch XR applications for different XR universes, which can be made visible and accessible to the user within the current XR universe. Some implementations can stream information between the current XR universe application and other XR universe applications, such as the user's avatar position and orientation, the position and orientation of a virtual camera, user credentials or identification, and/or other information using one or more inter-process communication (IPC) methods (e.g., WebSockets, WebRTC, remote procedure calls (RPC), messaging queues, etc.). By combining the embedded browser or application with an IPC, a virtual window into another XR universe can be composited within the current XR universe application, giving the user the impression that they are walking from one universe into another when entering through the virtual door connecting the two universes.

If the current XR universe application is executing in a web browser as a web application, virtual doors to other web application accessible XR universes can be implemented as browser sessions "within" the current web application. In some implementations, the XR universe traversal system launches a second browser in the background, directs that second browser to open to another XR universe web app, and causes the current XR universe to graphically render a portion of the second browser overlaid or composited within the current XR universe as a virtual door or portal. If the user moves their avatar through the virtual door or portal, the XR universe traversal system can change contexts to the second browser session while keeping the first browser session running in the background. IPC between the browser sessions can help communicate information about the avatar's position and orientation within one XR universe with the other XR universe, allowing the two sessions to operate in parallel as if the two XR web applications were a single application.

In cases where a user's device has insufficient computing power to run multiple XR universe applications simultaneously, an external server can be used to launch a separate XR universe application and stream a portion of its contents to an object within the current XR universe (e.g., by performing server-side rendering, receiving input controls from the user's device, and transmitting audio and video to the user's device).

In various embodiments, the XR universe traversal system can implement tools to allow users to manage virtual doors linking to their virtual property and/or linked to various destinations in the metaverse. For example, a user may wish to manually lock all ingress doors at their property for a time (e.g., if the user is architecting new features on their property, if the user is designing an art gallery and wishes to prevent others from seeing it until it is complete, if the user is having a private meeting at their property and doesn't want any additional guests to appear, etc.). As another example, a user may wish to add or remove specific users from an allow list and/or a block list (e.g., across all doors, some doors, or specific doors). In implementations where door keys can be minted and distributed to others, a user might want to mint new keys, revoke existing keys, or otherwise review previously-created keys to each of the virtual doors leading to their property. In some embodiments, the XR universe traversal system can implement tools to allow XR world owners to manage creation policies, access policies, and/or privacy preferences that define how users visiting their world can create and access virtual doors within their world. For instance, a user may want to manage permissions for allowing other users to create new doors leading to their property. The XR universe traversal system can provide UIs to allow the user to manage these various access control settings and/or permissions to their virtual doors (see, e.g., FIG. 12).

As described herein, the term "XR universe" generally refers to an XR application, environment, or platform made up of one or more virtual worlds within which multiple users can explore, meet, and interact with other users, objects, and artifacts backed up by the same application service. Often, an XR universe can define a set of primitives and/or rules that define user identity and ownership of virtual assets, XR world physics, and other mechanics. In addition, an XR universe typically represents environments with a predetermined level of fidelity and art style. Some XR universes can retrieve digital assets, such as virtual buildings, artwork (e.g., images, videos, non-fungible tokens (NFTs), etc.), web content. In addition, XR universes can interface with centralized and/or decentralized financial systems to implement an in-universe economy. Users can be represented within an XR universe by an avatar, which allows them to interact with other users and provides a player character that navigates through an XR universe. One or more XR worlds can be created and operated within an XR universe, with each XR world being managed by one or more users and/or entities ("owner(s)"). An XR universe can be accessed via two-dimensional (2D) interfaces (e.g., web browsers on a computer, applications on a mobile device, etc.) and/or XR interfaces (e.g., head mounted XR displays), depending on the particular application.

As described herein, the term "XR world" generally refers to a virtual space within an XR universe in which a user, group of users, and/or entity ("owner") can build and maintain on virtual land, which may be accessible by other users visiting that XR world. In some implementations, a user can traverse between XR worlds within the same XR universe without leaving a particular XR application or web application.

As described herein, the term "XR experience" generally refers to an XR world associated with a specific game, activity, or viewing experience. In some cases, an XR experience may be a game that can interface with XR input devices (e.g., headset, controller, etc.), and in some instances can allow multiple users to participate simultaneously. As a specific example, an XR experience may be a music-based game where users swing virtual objects to hit targets in a manner that synchronizes with the music. Accessing some XR experiences may involve launching an application on the user's device specific to that XR experience.

As described herein, the term "metaverse" can describe a superset of all virtual spaces, XR worlds, XR experiences, and/or XR universes where users (e.g., represented by avatars) can interact with virtual environments, virtual objects, and each other. The metaverse can include virtual universes, each hosted by one organization or multiple different organizations, and can be the top level of a virtual space conceptual hierarchy. Although it is contemplated that one host server can host multiple XR universes, it is also contemplated that multiple host servers can host a single XR universe.

Embodiments of the disclosed technology may include or be implemented in conjunction with an artificial reality system. Artificial reality or extra reality (XR) is a form of reality that has been adjusted in some manner before presentation to a user, which may include, e.g., virtual reality (VR), augmented reality (AR), mixed reality (MR), hybrid reality, or some combination and/or derivatives thereof. Artificial reality content may include completely generated content or generated content combined with captured content (e.g., real-world photographs). The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, a "cave" environment or other projection system, or any other hardware platform capable of providing artificial reality content to one or more viewers.

"Virtual reality" or "VR," as used herein, refers to an immersive experience where a user's visual input is controlled by a computing system. "Augmented reality" or "AR" refers to systems where a user views images of the real world after they have passed through a computing system. For example, a tablet with a camera on the back can capture images of the real world and then display the images on the screen on the opposite side of the tablet from the camera. The tablet can process and adjust or "augment" the images as they pass through the system, such as by adding virtual objects. "Mixed reality" or "MR" refers to systems where light entering a user's eye is partially generated by a computing system and partially composes light reflected off objects in the real world. For example, a MR headset could be shaped as a pair of glasses with a pass-through display, which allows light from the real world to pass through a waveguide that simultaneously emits light from a projector in the MR headset, allowing the MR headset to present virtual objects intermixed with the real objects the user can see. "Artificial reality," "extra reality," or "XR," as used herein, refers to any of VR, AR, MR, or any combination or hybrid thereof.

Existing XR universe traversal systems have a number of significant drawbacks. For instance, intra-universe XR teleportation can be achieved by placing a virtual object at a specific location that, when interacted with, causes a user's avatar to perform a one-way teleport to a different fixed location in the XR universe. Typically, this system requires a user to code a fixed coordinate or address in the XR universe to an arbitrary object and attach that transportation "link" to an object that visually and/or textually denotes the function of the object (e.g., "Teleport to TOWN SQUARE"). If the user wishes to travel back to their previous location, a corresponding "teleport back" object must be created at the destination. Such teleportation is typically unrestricted, allowing any user to fast travel between teleportation nodes. With respect to inter-universe XR teleportation, users typically have to exit a current XR universe application, open a separate XR universe application, log in to that separate XR universe, and navigate to their desired destination in that XR universe.

Implementations of the present application address these problems and others by providing a system for generating virtual doors that control access to a user's virtual property and enable rapid intra-universe, inter-universe, and/or inter-XR-experience traversal. Whereas existing intra-universe teleportation allows any user to navigate between fixed locations within an XR universe, the virtual doors described herein can be used to provide fast travel to and from a user's virtual property when the user allows it (e.g., at specific times, manually locked or unlocked by the user, via holders of door keys minted by the user, etc.). In addition, virtual doors can be configured to traverse between XR universes and/or inter-XR-experience by leveraging interoperable interfaces of various XR universes (e.g., inter-process communication, callback URLs, APIs, etc.) to enable rapid transitions between XR applications—thereby allowing users to traverse between XR universes without leaving an XR application and/or to automatically execute (and in some cases acquire) an alternate XR application for another XR experience. In some implementations, virtual doors can be instantiated at the destination location, which allows the user to rapidly return back to their original location.

By providing rapid and convenient XR universe traversal, users can more easily visit the virtual properties of their friends, travel to popular destinations, and explore the metaverse within the context of the metaverse (i.e., without having to leave the metaverse and navigate to a different web page or launch a different application). Notably, the XR universe traversal systems of the present disclosure can help retain a user on a particular XR universe as their "home base," allowing users to visit other XR universes while encouraging those users to primarily operate out of a "home" XR universe. Thus, when users wish to acquire new in-universe items and build up their virtual property, users are encouraged to spend virtual currency within the home XR universe, which serves as a more convenient gateway to other XR universes for metaverse exploration than other XR universes with traditional XR universe traversal systems. Moreover, implementations described herein overcome the existing deficiencies of XR universe traversal methods described above, and provide a technological solution rooted in XR universe access control and traversal between XR universes over a computer network for different devices and platforms Several implementations are discussed below in more detail in reference to the figures. FIG. 1 is a block diagram illustrating an overview of devices on which some implementations of the disclosed technology can operate. The devices can comprise hardware components of a computing system 100 that provide virtual doors within artificial reality (XR) universes for traversal within that XR universe and between other XR universes. In various implementations, computing system 100 can include a single computing device 103 or multiple computing devices (e.g., computing device 101, computing device 102, and computing device 103) that communicate over wired or wireless channels to distribute processing and share input data. In some implementations, computing system 100 can include a stand-alone headset capable of providing a computer created or augmented experience for a user without the need for external processing or sensors. In other implementations, computing system 100 can include multiple computing devices such as a headset and a core processing component (such as a console, mobile device, or server system) where some processing operations are performed on the headset and others are offloaded to the core processing component. Example headsets are described below in relation to FIGS. 2A and 2B. In some implementations, position and environment data can be gathered only by sensors incorporated in the headset device, while in other implementations one or more of the non-headset computing devices can include sensor components that can track environment or position data.

Computing system 100 can include one or more processor(s) 110 (e.g., central processing units (CPUs), graphical processing units (GPUs), holographic processing units (HPUs), etc.) Processors 110 can be a single processing unit or multiple processing units in a device or distributed across multiple devices (e.g., distributed across two or more of computing devices 101-103).

Computing system 100 can include one or more input devices 120 that provide input to the processors 110, notifying them of actions. The actions can be mediated by a hardware controller that interprets the signals received from the input device and communicates the information to the processors 110 using a communication protocol. Each input device 120 can include, for example, a mouse, a keyboard, a touchscreen, a touchpad, a wearable input device (e.g., a haptics glove, a bracelet, a ring, an earring, a necklace, a watch, etc.), a camera (or other light-based input device, e.g., an infrared sensor), a microphone, or other user input devices.

Processors 110 can be coupled to other hardware devices, for example, with the use of an internal or external bus, such as a PCI bus, SCSI bus, or wireless connection. The processors 110 can communicate with a hardware controller for devices, such as for a display 130. Display 130 can be used to display text and graphics. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network chip or card, video chip or card, audio chip or card, USB, firewire or other external device, camera, printer, speakers, CD-ROM drive, DVD drive, disk drive, etc.

In some implementations, input from the I/O devices 140, such as cameras, depth sensors, IMU sensor, GPS units, LiDAR or other time-of-flights sensors, etc. can be used by the computing system 100 to identify and map the physical environment of the user while tracking the user's location within that environment. This simultaneous localization and mapping (SLAM) system can generate maps (e.g., topologies, girds, etc.) for an area (which may be a room, building, outdoor space, etc.) and/or obtain maps previously generated by computing system 100 or another computing system that had mapped the area. The SLAM system can track the user within the area based on factors such as GPS data, matching identified objects and structures to mapped objects and structures, monitoring acceleration and other position changes, etc.

Computing system 100 can include a communication device capable of communicating wirelessly or wire-based with other local computing devices or a network node. The communication device can communicate with another device or a server through a network using, for example, TCP/IP protocols. Computing system 100 can utilize the communication device to distribute operations across multiple network devices.

The processors 110 can have access to a memory 150, which can be contained on one of the computing devices of computing system 100 or can be distributed across of the multiple computing devices of computing system 100 or other external devices. A memory includes one or more hardware devices for volatile or non-volatile storage, and can include both read-only and writable memory. For example, a memory can include one or more of random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, XR Universe Traversal System 164, and other application programs 166. Memory 150 can also include data memory 170 that can include, e.g., virtual addresses, virtual door metadata, virtual keys, virtual key metadata, user privacy preferences, intra-universe traversal libraries, inter-universe traversal libraries, XR application container configurations, user allow lists, user block lists, configuration data, settings, user options or preferences, etc., which can be provided to the program memory 160 or any element of the computing system 100.

Some implementations can be operational with numerous other computing system environments or configurations. Examples of computing systems, environments, and/or configurations that may be suitable for use with the technology include, but are not limited to, XR headsets, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2A:
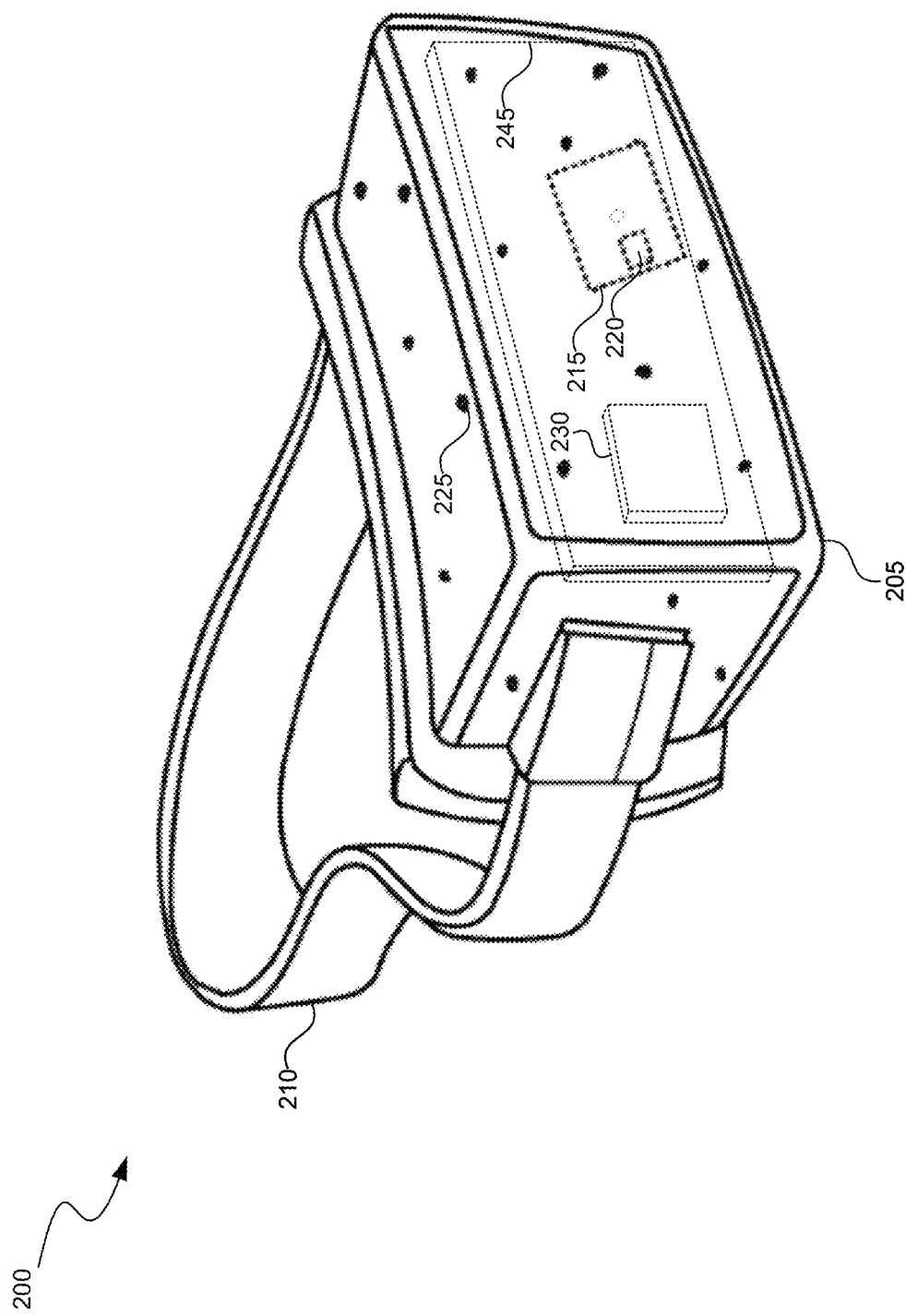
FIG. 2A is a wire diagram illustrating a virtual reality headset which can be used in some implementations of the present technology.

FIG. 2A is a wire diagram of a virtual reality head-mounted display (HMD) 200, in accordance with some embodiments. The HMD 200 includes a front rigid body 205 and a band 210. The front rigid body 205 includes one or more electronic display elements of an electronic display 245, an inertial motion unit (IMU) 215, one or more position sensors 220, locators 225, and one or more compute units 230. The position sensors 220, the IMU 215, and compute units 230 may be internal to the HMD 200 and may not be visible to the user. In various implementations, the IMU 215, position sensors 220, and locators 225 can track movement and location of the HMD 200 in the real world and in an artificial reality environment in three degrees of freedom (3DoF) or six degrees of freedom (6DoF). For example, the locators 225 can emit infrared light beams which create light points on real objects around the HMD 200. As another example, the IMU 215 can include e.g., one or more accelerometers, gyroscopes, magnetometers, other non-camera-based position, force, or orientation sensors, or combinations thereof. One or more cameras (not shown) integrated with the HMD 200 can detect the light points. Compute units 230 in the HMD 200 can use the detected light points to extrapolate position and movement of the HMD 200 as well as to identify the shape and position of the real objects surrounding the HMD 200.

The electronic display 245 can be integrated with the front rigid body 205 and can provide image light to a user as dictated by the compute units 230. In various embodiments, the electronic display 245 can be a single electronic display or multiple electronic displays (e.g., a display for each user eye). Examples of the electronic display 245 include: a liquid crystal display (LCD), an organic light-emitting diode (OLED) display, an active-matrix organic light-emitting diode display (AMOLED), a display including one or more quantum dot light-emitting diode (QOLED) sub-pixels, a projector unit (e.g., microLED, LASER, etc.), some other display, or some combination thereof.

In some implementations, the HMD 200 can be coupled to a core processing component such as a personal computer (PC) (not shown) and/or one or more external sensors (not shown). The external sensors can monitor the HMD 200 (e.g., via light emitted from the HMD 200) which the PC can use, in combination with output from the IMU 215 and position sensors 220, to determine the location and movement of the HMD 200.

Figure 2B:
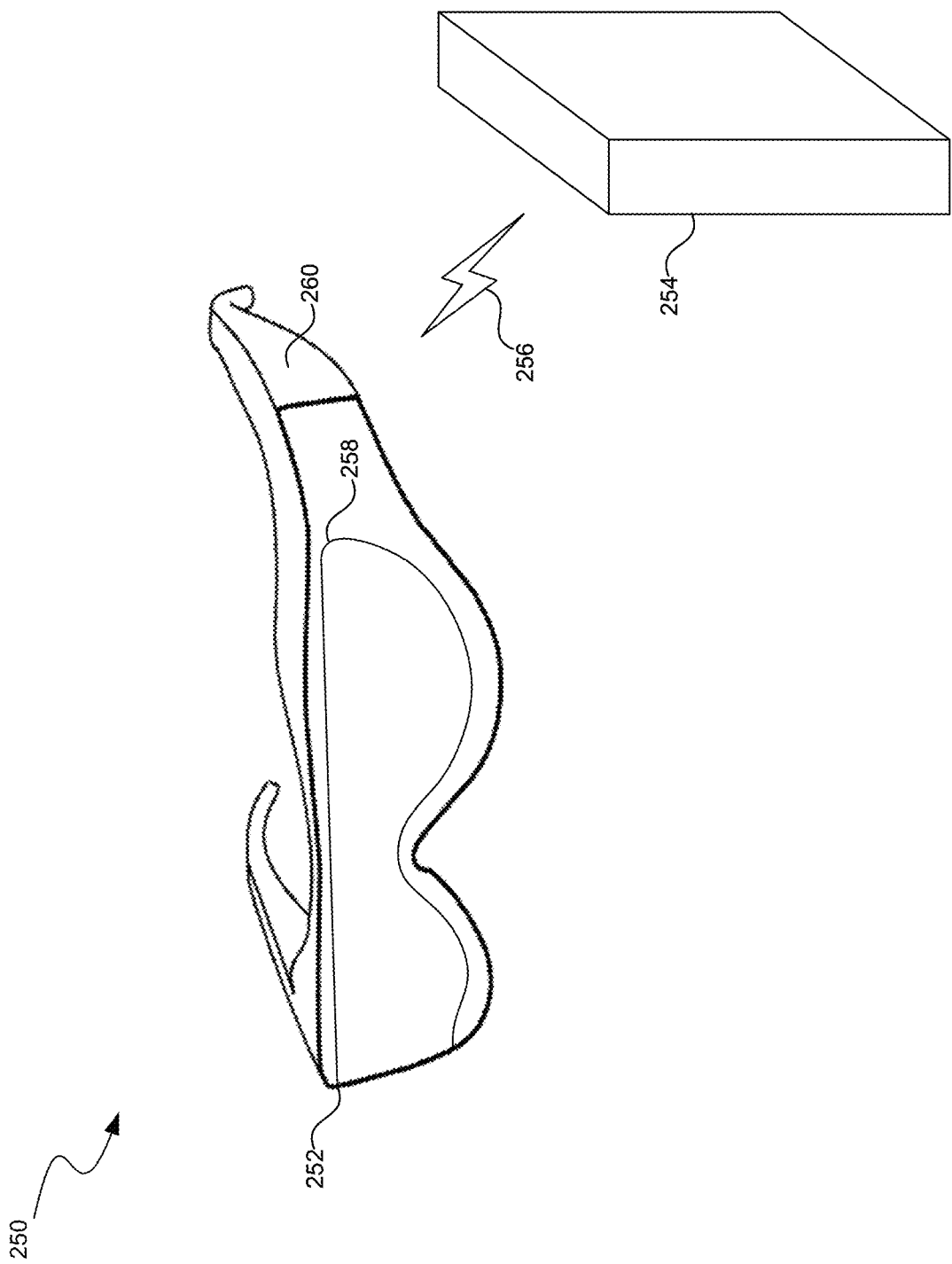
FIG. 2B is a wire diagram illustrating a mixed reality headset which can be used in some implementations of the present technology.

FIG. 2B is a wire diagram of a mixed reality HMD system 250 which includes a mixed reality HMD 252 and a core processing component 254. The mixed reality HMD 252 and the core processing component 254 can communicate via a wireless connection (e.g., a 60 GHz link) as indicated by link 256. In other implementations, the mixed reality system 250 includes a headset only, without an external compute device or includes other wired or wireless connections between the mixed reality HMD 252 and the core processing component 254. The mixed reality HMD 252 includes a pass-through display 258 and a frame 260. The frame 260 can house various electronic components (not shown) such as light projectors (e.g., LASERs, LEDs, etc.), cameras, eye-tracking sensors, MEMS components, networking components, etc.

The projectors can be coupled to the pass-through display 258, e.g., via optical elements, to display media to a user. The optical elements can include one or more waveguide assemblies, reflectors, lenses, mirrors, collimators, gratings, etc., for directing light from the projectors to a user's eye. Image data can be transmitted from the core processing component 254 via link 256 to HMD 252. Controllers in the HMD 252 can convert the image data into light pulses from the projectors, which can be transmitted via the optical elements as output light to the user's eye. The output light can mix with light that passes through the display 258, allowing the output light to present virtual objects that appear as if they exist in the real world.

Similarly to the HMD 200, the HMD system 250 can also include motion and position tracking units, cameras, light sources, etc., which allow the HMD system 250 to, e.g., track itself in 3DoF or 6DoF, track portions of the user (e.g., hands, feet, head, or other body parts), map virtual objects to appear as stationary as the HMD 252 moves, and have virtual objects react to gestures and other real-world objects.

Figure 2C:
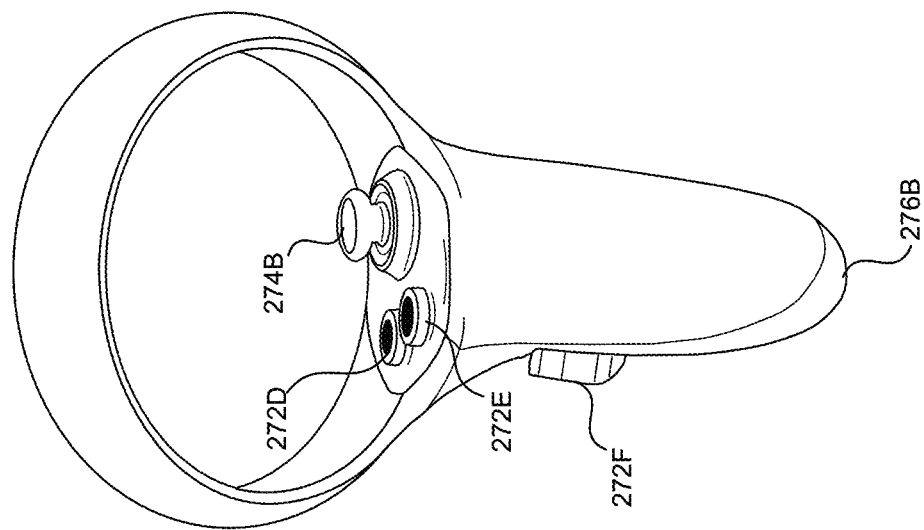
FIG. 2C is a wire diagram illustrating controllers which, in some implementations, a user can hold in one or both hands to interact with an artificial reality environment.
Figure 2C:
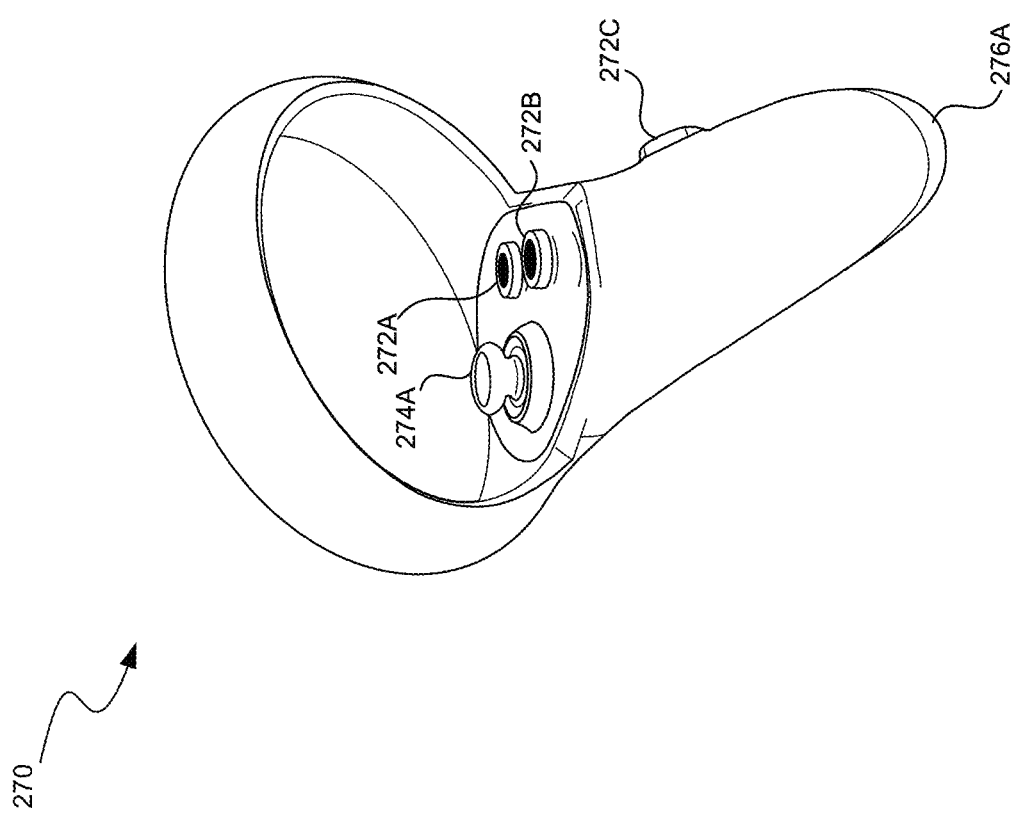

FIG. 2C illustrates controllers 270 (including controller 276A and 276B), which, in some implementations, a user can hold in one or both hands to interact with an artificial reality environment presented by the HMD 200 and/or HMD 250. The controllers 270 can be in communication with the HMDs, either directly or via an external device (e.g., core processing component 254). The controllers can have their own IMU units, position sensors, and/or can emit further light points. The HMD 200 or 250, external sensors, or sensors in the controllers can track these controller light points to determine the controller positions and/or orientations (e.g., to track the controllers in 3DoF or 6DoF). The compute units 230 in the HMD 200 or the core processing component 254 can use this tracking, in combination with IMU and position output, to monitor hand positions and motions of the user. The controllers can also include various buttons (e.g., buttons 272A-F) and/or joysticks (e.g., joysticks 274A-B), which a user can actuate to provide input and interact with objects.

In various implementations, the HMD 200 or 250 can also include additional subsystems, such as an eye tracking unit, an audio system, various network components, etc., to monitor indications of user interactions and intentions. For example, in some implementations, instead of or in addition to controllers, one or more cameras included in the HMD 200 or 250, or from external cameras, can monitor the positions and poses of the user's hands to determine gestures and other hand and body motions. As another example, one or more light sources can illuminate either or both of the user's eyes and the HMD 200 or 250 can use eye-facing cameras to capture a reflection of this light to determine eye position (e.g., based on set of reflections around the user's cornea), modeling the user's eye and determining a gaze direction.

Figure 3:
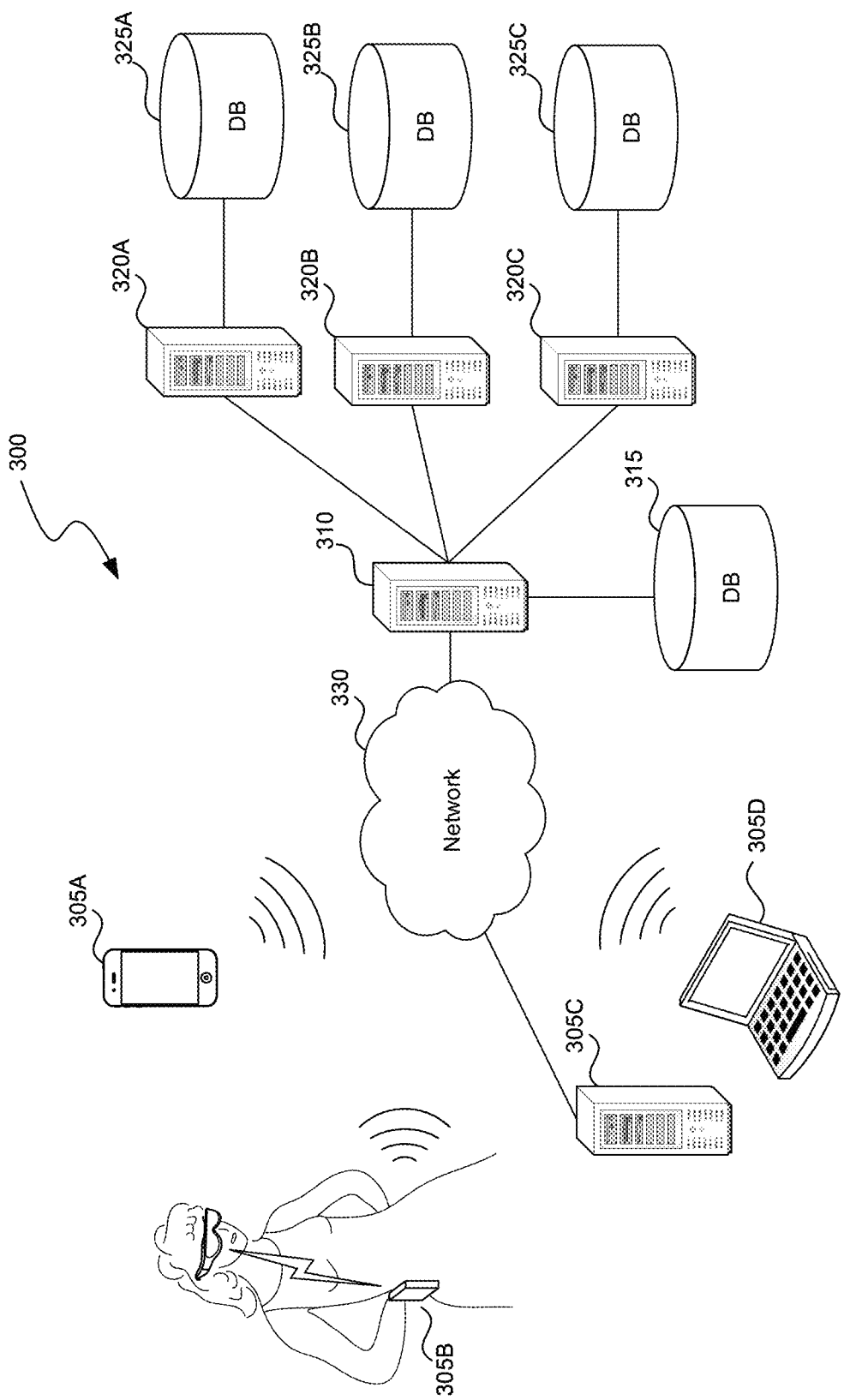
FIG. 3 is a block diagram illustrating an overview of an environment in which some implementations of the present technology can operate.

FIG. 3 is a block diagram illustrating an overview of an environment 300 in which some implementations of the disclosed technology can operate. Environment 300 can include one or more client computing devices 305A-D, examples of which can include computing system 100. In some implementations, some of the client computing devices (e.g., client computing device 305B) can be the HMD 200 or the HMD system 250. Client computing devices 305 can operate in a networked environment using logical connections through network 330 to one or more remote computers, such as a server computing device.

In some implementations, server 310 can be an edge server which receives client requests and coordinates fulfillment of those requests through other servers, such as servers 320A-C. Server computing devices 310 and 320 can comprise computing systems, such as computing system 100. Though each server computing device 310 and 320 is displayed logically as a single server, server computing devices can each be a distributed computing environment encompassing multiple computing devices located at the same or at geographically disparate physical locations.

Client computing devices 305 and server computing devices 310 and 320 can each act as a server or client to other server/client device(s). Server 310 can connect to a database 315. Servers 320A-C can each connect to a corresponding database 325A-C. As discussed above, each server 310 or 320 can correspond to a group of servers, and each of these servers can share a database or can have their own database. Though databases 315 and 325 are displayed logically as single units, databases 315 and 325 can each be a distributed computing environment encompassing multiple computing devices, can be located within their corresponding server, or can be located at the same or at geographically disparate physical locations.

Network 330 can be a local area network (LAN), a wide area network (WAN), a mesh network, a hybrid network, or other wired or wireless networks. Network 330 may be the Internet or some other public or private network. Client computing devices 305 can be connected to network 330 through a network interface, such as by wired or wireless communication. While the connections between server 310 and servers 320 are shown as separate connections, these connections can be any kind of local, wide area, wired, or wireless network, including network 330 or a separate public or private network.

Figure 4:
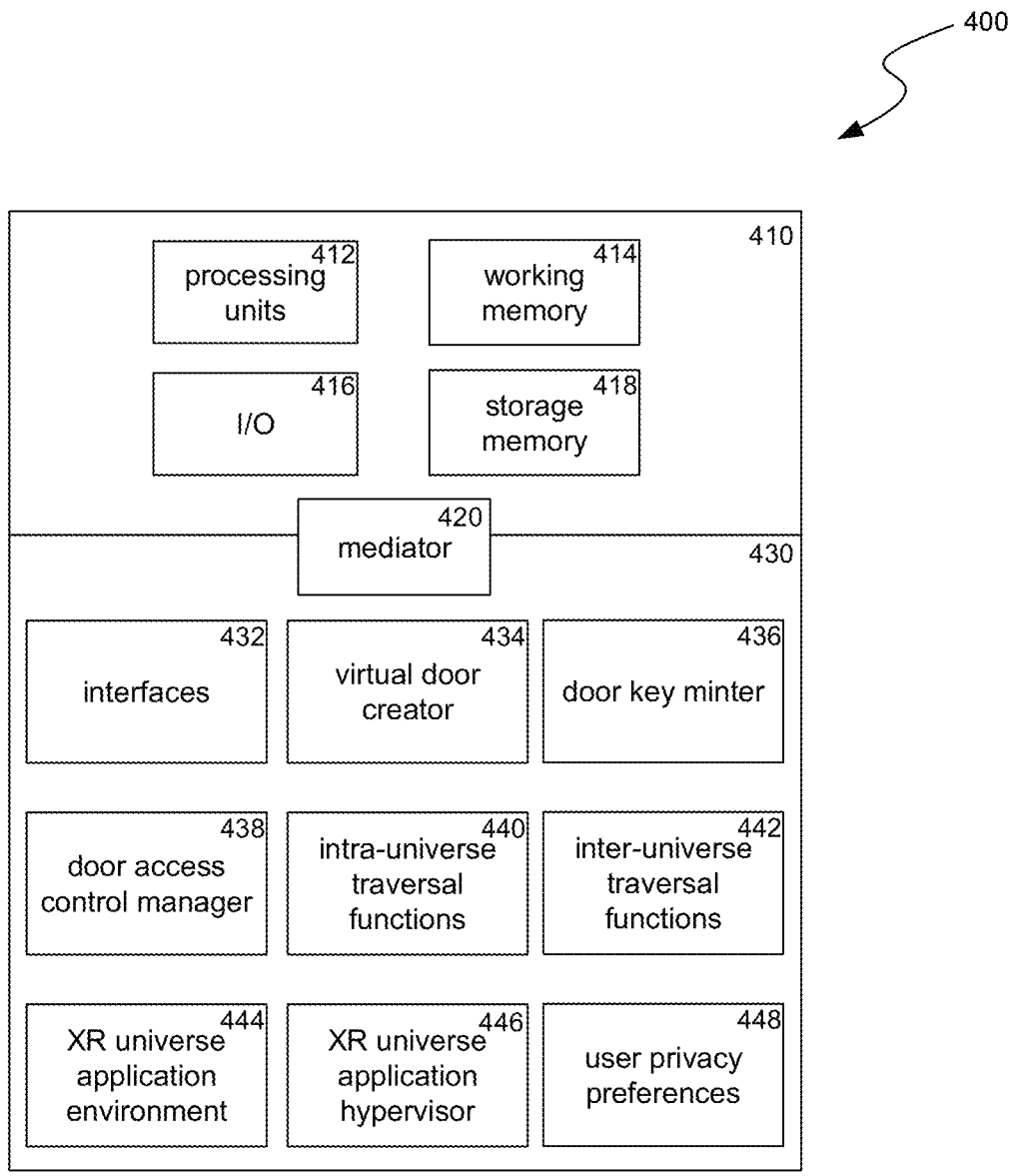
FIG. 4 is a block diagram illustrating components which, in some implementations, can be used in a system employing the disclosed technology.

FIG. 4 is a block diagram illustrating components 400 which, in some implementations, can be used in a system employing the disclosed technology. Components 400 can be included in one device of computing system 100 or can be distributed across multiple of the devices of computing system 100. The components 400 include hardware 410, mediator 420, and specialized components 430. As discussed above, a system implementing the disclosed technology can use various hardware including processing units 412, working memory 414, input and output devices 416 (e.g., cameras, displays, IMU units, network connections, etc.), and storage memory 418. In various implementations, storage memory 418 can be one or more of: local devices, interfaces to remote storage devices, or combinations thereof. For example, storage memory 418 can be one or more hard drives or flash drives accessible through a system bus or can be a cloud storage provider (such as in storage 315 or 325) or other network storage accessible via one or more communications networks. In various implementations, components 400 can be implemented in a client computing device such as client computing devices 305 or on a server computing device, such as server computing device 310 or 320.

Mediator 420 can include components which mediate resources between hardware 410 and specialized components 430. For example, mediator 420 can include an operating system, services, drivers, a basic input output system (BIOS), controller circuits, or other hardware or software systems.

Specialized components 430 can include software or hardware configured to perform operations for providing virtual doors within XR universes for traversal within that XR universe and between other XR universes. Specialized components 430 can include virtual door creator 434, door key minter 436, door access control manager 438, intra-universe traversal functions 440, inter-universe traversal functions 442, XR universe application environment 444, XR universe application hypervisor 446, user privacy preferences 448, and components and APIs which can be used for providing user interfaces, transferring data, and controlling the specialized components, such as interfaces 432. In some implementations, components 400 can be in a computing system that is distributed across multiple computing devices or can be an interface to a server-based application executing one or more of specialized components 430. Although depicted as separate components, specialized components 430 may be logical or other nonphysical differentiations of functions and/or may be submodules or code-blocks of one or more applications.

Virtual door creator 434 can interface with XR universe application(s) to facilitate the creation and operation of virtual doors connecting two locations in the same XR universe and/or connecting two locations in different XR universes. Each XR universe may implement its own HTTP URL schema, RPC protocol, API, and/or other programmatic access to make requests to create, access, modify, or delete assets within that XR universe. Virtual door creator 434 can provide a universal interface that translates a generic command (e.g., a request to create virtual door A in Universe A at location A linked to virtual door B in Universe B at location B) into corresponding function calls to the relevant XR universe servers to effectively create bridges or portals connecting two locations in the metaverse. In some implementations, virtual door creator 434 can also provide middleware to resolve requests to hop across XR worlds or XR universes, thereby enhancing interoperability between XR universes without necessarily conforming to any particular standard or protocol.

In some embodiments, virtual door creator 434 can provide graphical assets that are rendered within an XR universe. For example, virtual door creator 434 can be configured to generate the same or similar graphical representation of a door in different XR universes—thereby providing a consistent design language across potentially differently styled XR universes, and enabling users to intuitively recognize a door or portal to enter a different XR universe or return to an origin XR universe. Virtual door creator 434 can employ graphical compositing techniques to overlay, composite, or otherwise superimpose a virtual door into an XR universe (server side or client side), such that the same or similar technique can be used to render virtual doors in various XR universes without necessarily having to create and store new assets with each XR universe.

Virtual door creator 434 can interface with various specialized components 430 to facilitate the creation and use of virtual doors. For example, virtual door creator 434 can interface with door key minter 436 to request the creation or minting of new virtual door keys upon user request. Virtual door creator 434 can interface with intra-universe traversal functions 440 and inter-universe traversal functions 442 to determine the operation(s) to perform to cause a user to traverse from one location in the metaverse to another. In some implementations, virtual door creator 434 can operate as a service within a web browser or on an operating system and communicate with XR universe applications via XR universe application environment 444 and/or XR universe application hypervisor 446. Furthermore, virtual door creator 434 can interface with user privacy preferences 448 when creating a new virtual door to determine the initial privacy configurations for the virtual door, which can be subsequently stored as metadata in association with the virtual door and accessed by door access control manager 438 when determining whether to authorize access to a virtual door by a particular user.

Door key minter 436 can create, generate, or cause new keys to be minted and/or issued that provide access to virtual doors. In some embodiments, door key minter 436 can be a function of an XR universe or an external service hosted in a centralized server to generate and assign ownership of door keys to XR universe users. Door key minter 436 may centrally manage generated keys, owners of those keys, and permissions related to those keys. Door key minter 436 may provide an API or other programmatic interface to allow virtual door creator 434 to request the creation of new keys and/or store metadata about each key.

In some embodiments, door key minter 436 can interface with a blockchain to create cryptographically verified, NFT-based door keys—each of which may be configured as re-assignable or saleable, or non-assignable, depending on the particular application. For example, door key minter 436 may operate as a smart contract-based decentralized application ("dApp") that can receive information about a virtual door (e.g., identification, metadata, etc.), the owner of the virtual door, and the recipient of the key, and in turn mints an NFT that permanently links to a document (e.g., on a peer-to-peer blockchain-based distributed filesystem) containing metadata about the door key, and transfers that NFT to the recipient's cryptocurrency wallet address.

Door access control manager 438 can determine whether an attempt by a user to access a virtual door is authorized and/or permitted. For example, door access control manager 438 can interface with user privacy preferences 448 to determine whether a virtual door leading into an owner's virtual property is unlocked or locked (e.g., the owner's manual lock settings, based on a schedule defining when the door is locked or unlocked, according to the owner's allow list and/or block list, etc.). Door access control manager 438 can also facilitate communication with users in order to obtain their permission to have other users access their virtual door(s). For instance, an owner may place a virtual door in their property that is locked by default, but provides access to that user's property by others if the owner explicitly grants a request to access the door (e.g., if the user wants to create a gateway to their property that is effectively locked by default, but can be unlocked for specific users upon request).

In some cases, one user may wish to create a dedicated virtual door that links to another user's private virtual property. Door access control manager 438 can handle requests for authorization to virtual property owners to add new virtual doors on their properties. For example, if two people meet in the metaverse and become friends, they may wish to create virtual doors connecting their properties so that they can quickly and easily visit each other. If one of the users requests to create a new virtual door between their property and their friend's property, door access control manager 438 can request authorization by the friend to create the new virtual door on the friend's property.

Collectively, virtual door creator 434, door key minter 436, and door access control manager 438 can serve as a virtual door controller, which facilitates the creation of and access to virtual doors. The term "virtual door controller" may be used herein to refer to any application or service executed locally or on a server that provides an interoperable virtual door system for connecting different locations within the metaverse.

Intra-universe traversal functions 440 may be any SDK, API, RPC, or other programmatic interface that can be used to quickly move a user's avatar from one location to another within an XR universe. For example, some XR universes may provide intra-universe traversal functions in the form of a URL or URI schema which defines a semantically meaningful hierarchical structure of a location or coordinate within the XR universe. As another example, an XR universe may provide a REST API that allows a user to make an HTTP GET or POST request to traverse between locations within the XR universe. In some cases, an XR universe application may provide in-application tools that simplify access to such APIs or SDKs.

Inter-universe traversal functions 442 may be any SDK, API, or programmatic interface that can trigger a transition whereby a user exits a current XR universe and enters a different XR universe. For example, inter-universe traversal functions 442 may include parameterized functions that can convert or translate a generic request to travel to a different XR universe into XR universe-specific function calls (e.g., intra-universe traversal functions 440). In addition, inter-universe traversal functions 442 can invoke in-browser or OS-level operations to create new browser windows, spin up containers or virtual machines, and/or launch applications. For instance, an inter-universe traversal function 442 may access an application library, known paths to application binaries, launch a new browser and go to a particular URL, start a virtual machine or container, or otherwise interact with the environment within which XR applications are executed on the particular computing device.

XR universe application environment 444 can be any runtime environment within which an XR universe application is executed, such as a browser. The XR universe application environment 444 can also include plugins, libraries, services, and/or other assets that facilitate graphics rendering, interfaces with input devices (e.g., VR headset, controller, mouse, keyboard, etc.), and/or otherwise can aid in providing a runtime environment for XR applications. In some implementations, XR universe application environment 444 can provide a substantially standardized interface between peripheral or input devices and one or more XR applications, such that the same peripheral or input devices can serve as inputs into two or more XR applications simultaneously.

XR universe application environment 444 can provide a canvas, graphical layer, and/or framework for rendering 2D or 3D graphics to a display (e.g., WebGL), which allows one or more applications to render graphical assets, 2D objects, and/or 3D objects to the display. For instance, one application may access a document object model (DOM) of a browser to render a 3D environment of a portion of an XR universe, while another application modifies the DOM and/or renders additional objects within the same canvas, effectively allowing the second application to perform masking, blending, and/or composite rendering of additional assets or objects. As a result, XR universe application environment 444 can provide frameworks and/or APIs to enable a virtual door controller to render a virtual door within an XR universe from the user's perspective, with the virtual door potentially being rendered client-side by a separate application from the XR universe application.

XR universe application hypervisor 446 can be any OS-level application runtime environment within which XR universe applications are executed, such as a shell, container execution engine, virtual machine, and/or other runtime environment. XR universe application hypervisor 446 may provide similar functionality as XR universe application environment 444, but can involve executing applications natively or within containers rather than within a web browser. XR universe application hypervisor 446 can start and stop execution of different XR applications, and enable IPC between multiple XR applications (e.g., via messaging queues, messaging protocols, etc.). In some embodiments, XR universe application hypervisor 446 can execute services that implement aspects of a virtual door controller on a device, such as an application that communicates with a virtual door controller service running on a server over the Internet.

Figure 12:
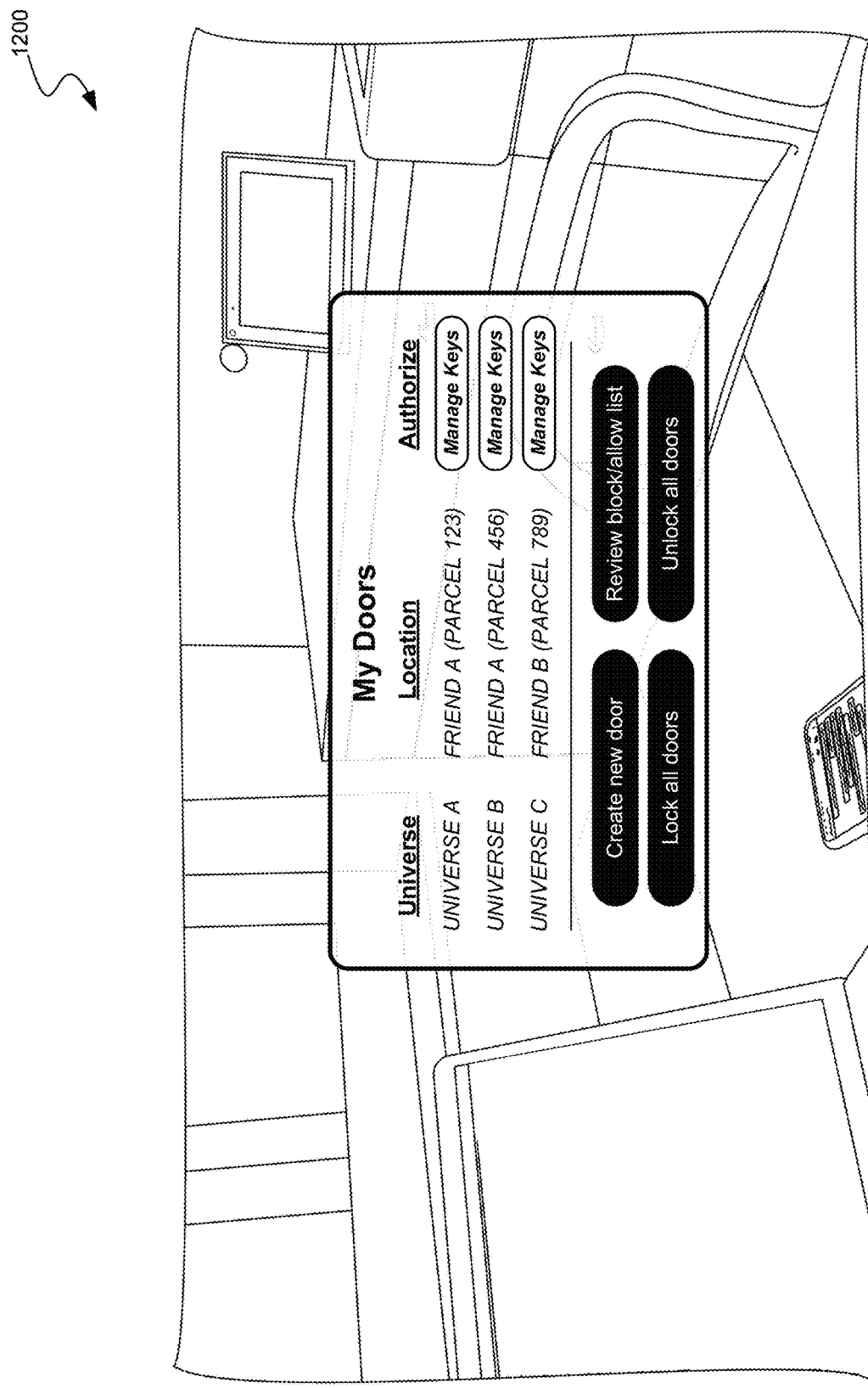
FIG. 12 is a conceptual diagram illustrating an example user interface (UI) for managing virtual doors.

User privacy preferences 448 may include data storage for APIs for managing user virtual door permissions and privacy preferences. In some embodiments, an XR universe application can interface with user privacy preferences 448 to provide tools or UIs for users to manage their privacy preferences specifically associated with virtual doors within and between XR universes. FIG. 12 illustrates an example UI rendered within an XR environment to enable a user to manage their virtual door privacy preferences. Example privacy preferences can include the provision, configuration, and removal of door keys, updating allow lists and block lists, locking and/or unlocking doors, configuring default privacy settings, and/or configuring door locking schedules to permit access to virtual doors that user owns only during certain hours of the day.

Those skilled in the art will appreciate that the components illustrated in FIGS. 1-4 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 5:
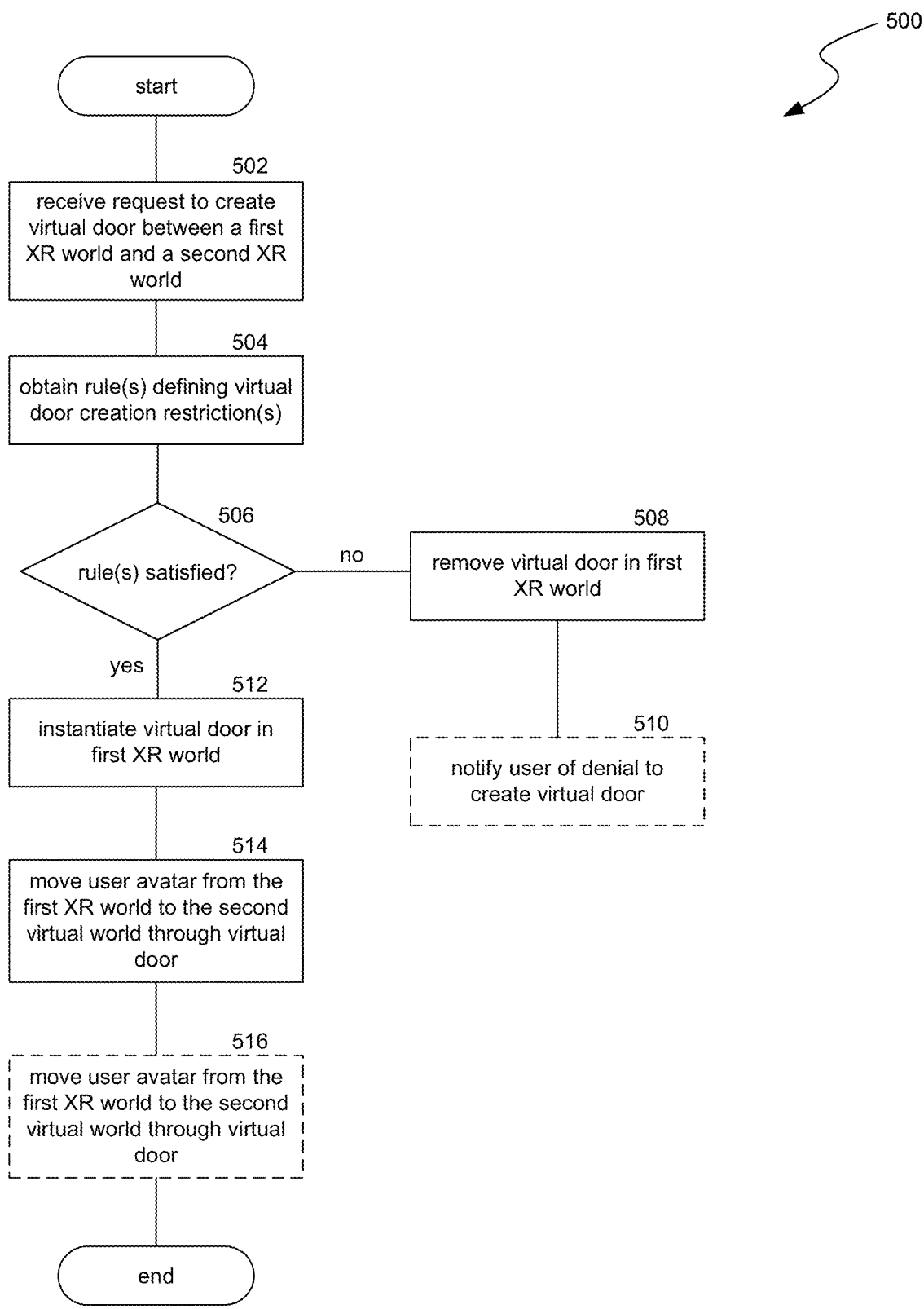
FIG. 5 is a flow diagram illustrating a process used in some implementations of the present technology for creating new virtual doors between two locations in an XR universe.

FIG. 5 is a flow diagram illustrating a process 500 used in some implementations for creating new virtual doors between two locations in an XR universe. In some implementations, process 500 can be performed as a response to a user request to create a new virtual door. Process 500 can be performed by, for example, XR universe traversal system 164 of FIG. 1, either on a server (e.g., a host server described herein) or combination of servers over a network, or locally on a user system or device, i.e., an XR device (e.g., a head-mounted display) or 2D device, such as a computer or other display or processing device. In some implementations, some steps of process 500 can be performed on a server, while other steps of process 500 can be performed locally on a user device. Although illustrated as having only one iteration, it is contemplated that process 500 can be performed multiple times, repeatedly, consecutively, concurrently, in parallel, etc., as requests to create virtual doors are received from or at one or more user devices. Some steps of process 500 can describe changing aspects of an XR universe, such as instantiating or removing objects within that environment, moving user avatars in the environment, etc., which may be performed client side within an XR application or server side within an XR universe server.

At block 502, process 500 receives a request from a user to create a virtual door between a first XR world and a second XR world. In various embodiments, the first and second XR worlds are within the same XR universe, but are created and maintained by different owners. In other embodiments, the first XR world is a world within a first XR universe, while the second XR world is a world within a second XR universe—with the first and second XR universes potentially being hosted by different entities. In some cases, the first XR world is a world within an XR universe, and the second XR world is hosted by a different XR experience (e.g., an XR game, XR movie, etc. not in control of the first XR world).

In this example, the user (e.g., a visitor to an XR world) transmits a request to a virtual door controller. For example, the user visiting an XR world may invoke an in-game or in-application menu and select an option to create a new virtual door within that world. The request may contain some combination of metadata about the user making the request, metadata about the first XR world and the second XR world (e.g., tags, content type, age restrictions, category, rating(s), the XR universe within which each XR world is contained, the owner(s) or operator(s) of the respective XR worlds, etc.) and/or other details that can be used by the virtual door controller to process the request.

At block 504, process 500 obtains rule(s) that define any privacy preferences, a creation policy, and/or any other restrictions on the creation of virtual doors by users visiting the first XR world. For instance, the owner of the first XR world might provide age-appropriate content for children within the world, and accordingly may define a rule that prevents the creation of virtual doors that link to XR worlds or XR experiences that contain adult content or are rated for ages above a threshold limit. As another example, the owner of the first XR world might define a rule that only allows the creation of virtual doors to other XR worlds that share one or more common characteristics, such as a category, content type, tag, subject matter, or other criteria defining the characteristics of the XR world. In some cases, the owner of the first XR world can maintain a user allow list which explicitly permits specific users to create virtual doors, while denying users not on the allow list from creating virtual doors. Similarly, the owner of the first XR world can maintain a user block list which explicitly denies specific users from creating virtual doors, while permitting users not on the block list to create virtual doors. A creation policy can also limit the creation of new virtual doors to XR worlds that meet or exceed a threshold rating, such that virtual doors within the first XR world only link to other highly-rated XR worlds. In some implementations, the owner of the first XR world can specify a rule that requires the owner's explicit approval to create new virtual doors within the first XR world by other users, allowing the owner to also manually moderate the links from their XR world to other XR worlds. The rules may be stored on a host server operating a virtual door controller and/or by an XR universe server hosting the first XR world.

At block 506, process 500 determines whether the obtained rule(s) are satisfied based at least in part on information contained within the request. For example, the request can include metadata about the second XR world, such as an age rating for the content, tags, ratings, the type or category of content in the second XR world, and/or other information about the second XR world. Process 500 can compare the metadata associated with the second XR world against the rule(s) to determine if the conditions of the rule(s) have been satisfied. For instance, if a rule requires that the second XR world have a rating above a minimum threshold rating, process 500 can determine whether the second XR world's rating exceeds that minimum threshold rating. If the rule(s) contain a user allow list or a user block list, process 500 can determine whether the user making the request is on the allow list or block list, and accordingly determine whether the rule has been satisfied (e.g., the user making the request being included in the allow list or absent from the block list). In cases where the rule(s) require explicit consent by the owner of the first XR world to create a new virtual door, block 506 can involve transmitting a request to the owner and receiving a response from the owner indicating their approval or denial of the request. If multiple rules are specified in the rule(s), process 500 can determine whether each rule is satisfied and can deem the rule(s) to be collectively not satisfied if at least one of the rules is violated. The operations for processing the request against one or more rules may be triggered by the request and be performed automatically.

If process 500 determines that the rule(s) are not satisfied, process 500 proceeds to block 508. At block 508, process 500 removes or blocks creation of the virtual door within the first XR world. In some implementations, a graphical object representing an unapproved virtual door in the first XR world might be rendered in the XR environment on the user's device. For example, an unapproved virtual door may be rendered that is translucent or otherwise graphically styled to indicate that the virtual door is not yet functional. In such implementations, the "pending" virtual door in the first XR world may be removed from the XR environment. Then, at block 510, process 500 may notify the user of the denial to create a new virtual door due to the request failing to meet one or more rules, conditions, and/or criteria restricting the creation of virtual doors within the first XR world.

Alternatively, if process 500 determines that the rule(s) have been satisfied (i.e., the request does not violate any of the rule(s)), process 500 proceeds to block 512. At block 512, process 500 can instantiate (or cause the instantiation of) corresponding virtual doors in the first XR world. In some implementations, the XR universe of the first XR world can create a new asset in the XR universe representing the virtual door. In other implementations, a virtual door controller can render the virtual door within the first XR world (e.g., as a graphical overlay or composite). In either case, the virtual door may become visible to the user from their respective perspective, which can be interacted within the XR universe(s) by the user's avatar.

At block 514, process 500 can move the user's avatar from the first XR world to the second XR world through the virtual door. For example, a virtual door controller can receive a request from the user to traverse through the virtual door, triggering process 500 to move and/or instantiate the user's avatar in the second XR world. If the first and second XR worlds are within the same XR universe, process 500 can update the position of the user's avatar within that XR universe. Alternatively, if the first and second XR worlds are in different XR universes, process 500 can simulate the traversal of the user's avatar through the virtual door by launching an application for the destination XR universe (if the universes are served by different applications on the user's artificial reality device), instantiating the user's avatar within the destination XR universe (e.g., with a different account, a different avatar, etc.), and transitioning the user's device from the current XR universe application to the destination XR universe application. Similarly, if the second XR world is an XR experience, process 500 can simulate the traversal of the user through the virtual door by launching an application for the XR experience and transitioning the user's device from the XR universe application into the XR experience. Accordingly, process 500 may not necessarily "move" the same user avatar across different XR universes, but rather give the impression to the user that their virtual presence is transferred from its current avatar at its current location within the current XR universe into a different avatar at a different location within a different XR universe. It will be appreciated that the phrase "moving the user's avatar" may be used to describe a process of giving the user the impression of their traversal through the metaverse, even though the positions of different avatars are not moved between different XR universes.

Various techniques to achieve such inter-universe traversal are shown and described in more detail with respect to FIGS. 9A, 9B, 10A-10C, and 11, which may differ somewhat from the techniques described above. For instance, traversing from one XR universe to another may involve creating a browser within the XR universe, launching a web application within that browser to enter a different XR universe, and then entering "into" that browser to experience that different XR universe that is rendered "within" the current XR universe.

In some implementations, a corresponding virtual door can be created within the second XR world which "links back" to the respective virtual door in the first XR world. In other implementations, the second XR world may not instantiate a virtual door as a graphical object within an XR environment, and the user may traverse back to the first XR world by selecting an option within a menu while in the second XR world, speaking a voice command, and/or opening up a control panel (e.g., an overlaid graphical UI provided by a virtual door control) and selecting an option to return back to the first XR world, among other possible return mechanisms. At block 516, process 500 can move the user's avatar from the second XR world back to the first XR world through the virtual door. The virtual doors may provide bi-directional shortcuts between the first and second XR worlds. In some embodiments, a virtual door controller may determine the second XR world based on the user's identity (e.g., if the same virtual door at the second XR world is used by multiple users from different origin XR worlds). The virtual door controller can also store a traversal record for each user, such that the user moving "back" through the virtual door at the destination traverses them back to their previous location.

Figure 6:
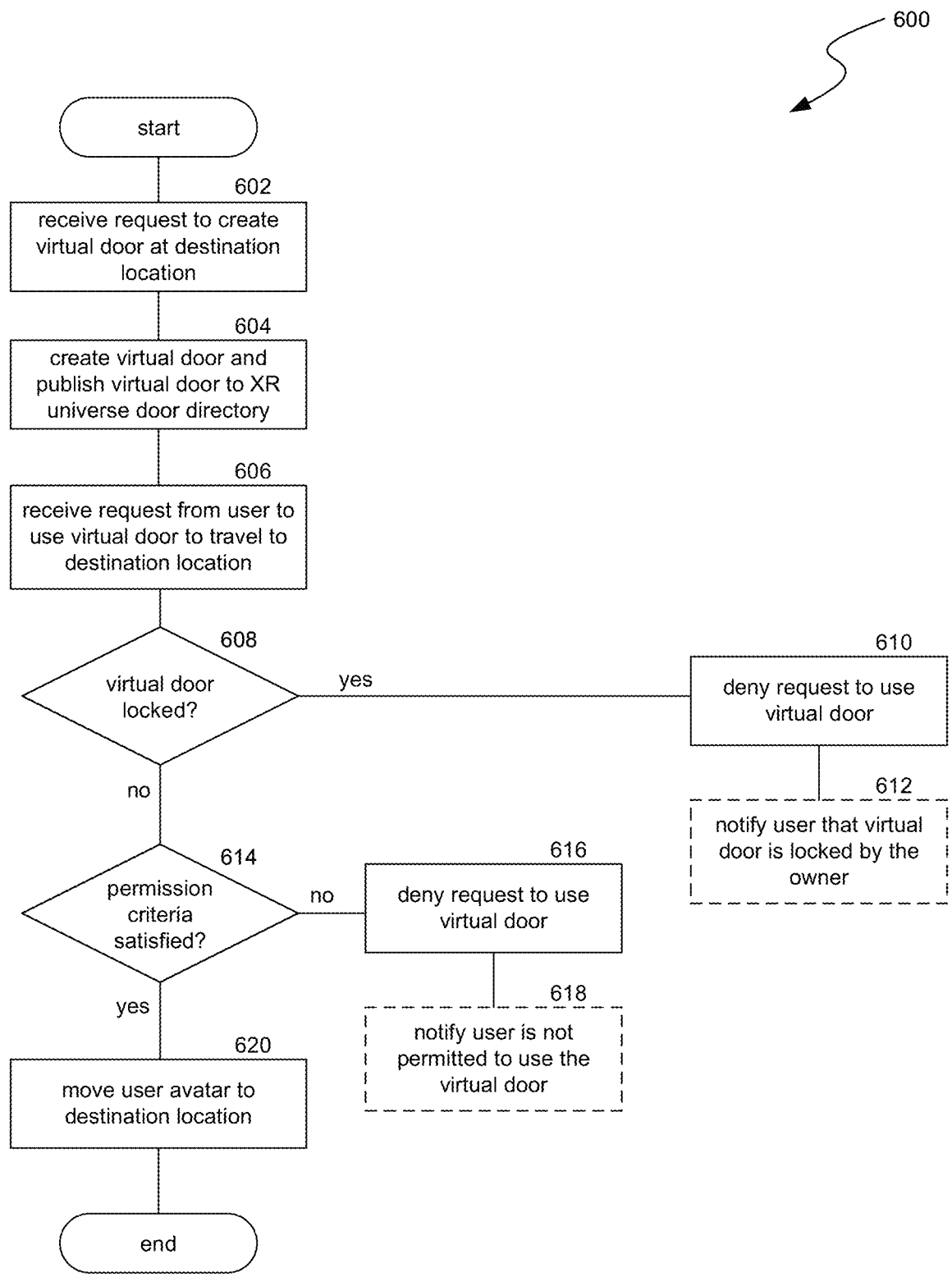
FIG. 6 is a flow diagram illustrating a process used in some implementations of the present technology for providing user settings-based access control across a virtual door connecting two locations in an XR universe.

FIG. 6 is a flow diagram illustrating a process 600 used in some implementations for providing user settings-based access control across a virtual door connecting two locations in an XR universe. In some implementations, process 600 can be performed as a response to a user request to create a new virtual door, and/or as a response to one user attempting to access another virtual door. Process 600 can be performed by, for example, XR universe traversal system 164 of FIG. 1, either on a server (e.g., a host server described herein) or combination of servers over a network, or locally on a user system or device, i.e., an XR device (e.g., a head-mounted display) or 2D device, such as a computer or other display or processing device. In some implementations, some steps of process 600 can be performed on a server, while other steps of process 600 can be performed locally on a user device. Although illustrated as having only one iteration, it is contemplated that process 600 can be performed multiple times, repeatedly, consecutively, concurrently, in parallel, etc., as requests to create virtual doors are received from or at one or more user devices. Some steps of process 600 can describe changing aspects of an XR universe, such as instantiating or removing objects within that environment, moving user avatars in the environment, etc., which may be performed client side within an XR application or server side within an XR universe server.

At block 602, process 600 receives a request from an owner to create a virtual door at a destination location, such as within a virtual property of the owner. In this example, an owner may wish to create a virtual door to their property to grant other users access to their virtual property. The request may contain some combination of metadata about the user making the request, the destination location, the destination XR universes, and/or other details that can be used by a virtual door controller to process the request.

At block 604, process 600 can create the virtual door and publish the existence of the virtual door to an XR universe door directory, database, or list. In some cases, an owner of a property might design their property and intend to grant other users access to it, such as during an open house, gala, or some other event. In other cases, an owner might wish to list the virtual door to their property with a directory to allow friends and/or other users to find the door (e.g., to create virtual doors or portals that link to the owner's virtual door). Process 600 can add the newly-created virtual door to a searchable list, encouraging others to discover or find their property.

At block 606, process 600 receives a request from a user to use the owner's virtual door to travel to the destination location. Block 606 may be similar to block 502 as described above with respect to FIG. 5, except that the destination virtual door has already been created at block 604. In this example, another user (e.g., a friend, colleague, etc.) might want to create a virtual door at their property that acts as a shortcut or portal to the owner's virtual property. In some embodiments, a user might be able to travel to the owner's virtual door without necessarily creating a virtual door on their property (e.g., creating a temporary portal, simply fast traveling/traversing to the virtual door like a waypoint, etc.).

In this example, the owner may have configured privacy settings and/or permissions that define access control rules, allow lists, and/or block lists for the virtual door. As a result, a user wishing to travel to and/or link a different virtual door to the owner's virtual door might have to satisfy privacy settings, permissions, and/or authenticate themselves before a virtual door controller permits access to the owner's virtual door.

At block 608, process 600 determines whether the virtual door is locked. In some implementations, a virtual door might be manually locked or unlocked by the owner, which prevents users from accessing and/or linking to their virtual door. If the virtual door is locked, process 600 proceeds to block 610. At block 610, process 600 denies the request to use the owner's virtual door. In some implementations, process 600 can proceed to block 612 to notify the user that the virtual door could not be accessed because it is locked by the owner. The content of the notification and the level of detail about the reasons for the denial may vary among different implementations.

However, if the virtual door is not locked, process 600 proceeds to block 614, where process 600 determines whether owner permission criteria has been satisfied. In some cases, an owner may choose to leave their virtual door unlocked, but specifically deny other users access to the virtual door during certain hours of the day, certain days of the year, prevent specific users in a block list from accessing the door at any time, permit only users with certain affiliations and/or reputation to enter the virtual door, and/or according to any other suitable criteria. If process 600 determines that permission criteria are not satisfied, process 600 proceeds to block 616, where process 600 denies the user's request to use the virtual door. Then, at block 618, process 600 may notify the user that they are not permitted to access the virtual door.

Alternatively, if the permission criteria are satisfied, process 600 proceeds to block 620, where process 600 moves the user's avatar to the destination location. Block 620 may be similar to block 516 as described above with respect to FIG. 5.

Figure 7:
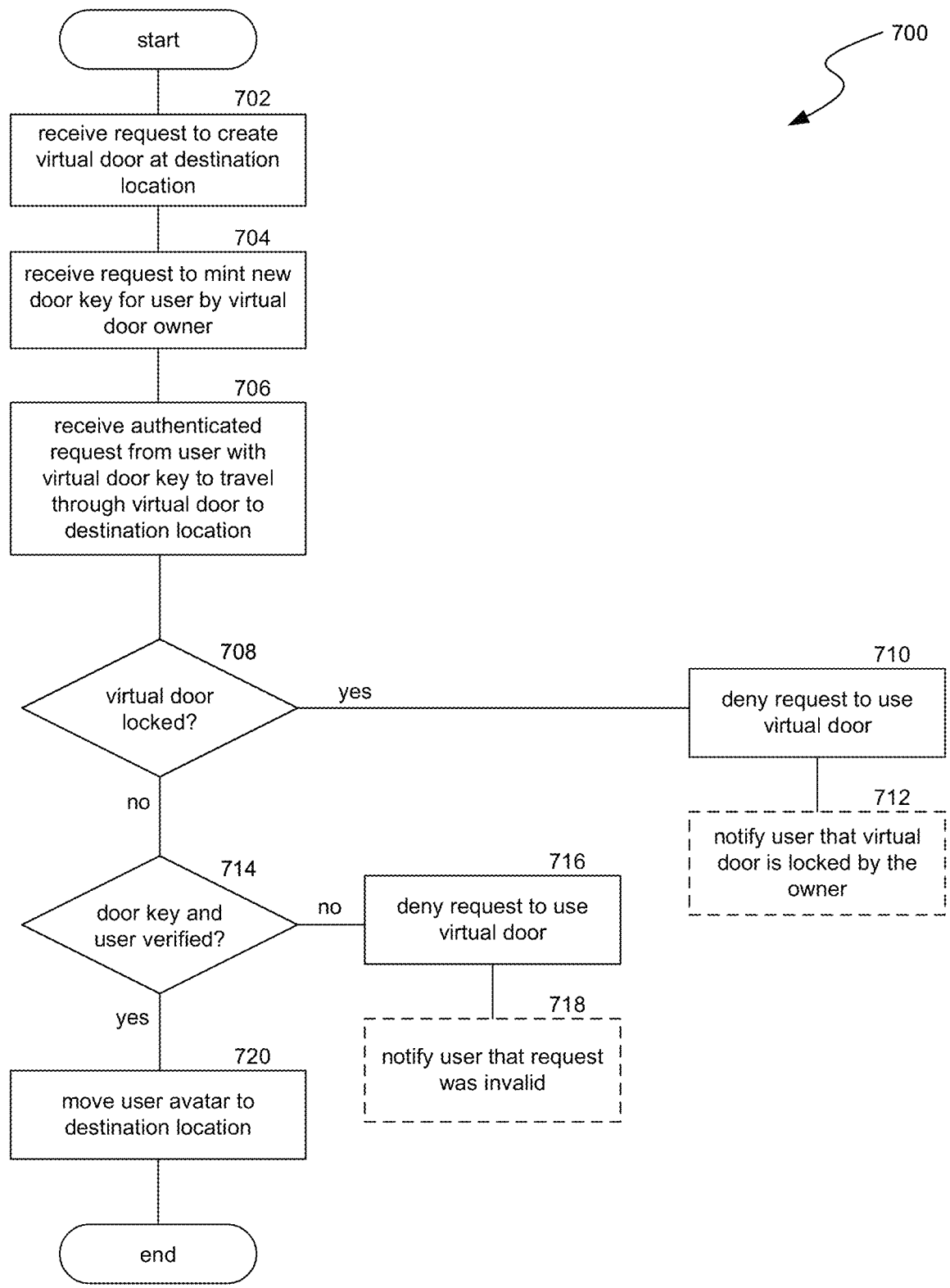
FIG. 7 is a flow diagram illustrating a process used in some implementations of the present technology for providing key-based access control across a virtual door connecting two locations in an XR universe.

FIG. 7 is a flow diagram illustrating a process 700 used in some implementations for providing key-based access control across a virtual door connecting two locations in an XR universe. In some implementations, process 700 can be performed as a response to a user request to create a new virtual door, and/or as a response to one user attempting to access another virtual door. Process 700 can be performed by, for example, XR universe traversal system 164 of FIG. 1, either on a server (e.g., a host server described herein) or combination of servers over a network, or locally on a user system or device, i.e., an XR device (e.g., a head-mounted display) or 2D device, such as a computer or other display or processing device. In some implementations, some steps of process 700 can be performed on a server, while other steps of process 700 can be performed locally on a user device. Although illustrated as having only one iteration, it is contemplated that process 700 can be performed multiple times, repeatedly, consecutively, concurrently, in parallel, etc., as requests to create virtual doors are received from or at one or more user devices. Some steps of process 700 can describe changing aspects of an XR universe, such as instantiating or removing objects within that environment, moving user avatars in the environment, etc., which may be performed client side within an XR application or server side within an XR universe server.

At block 702, process 700 receives a request from an owner to create a virtual door at a destination location, such as within a virtual property of the owner. Block 702 may be similar to or the same as block 602 as described above with respect to FIG. 6.

At block 704, process 700 receives a request from the virtual door owner to mint a new door key for a user. In some embodiments, a virtual door controller can implement functions for generating new keys (e.g., UUIDs, unique hash codes, keys encrypted using cryptographic processes such as RSA, etc.), which can be stored in memory or data storage and maintained by the virtual door controller. Such keys can be maintained by a virtual door controller and associated with configurations modifiable by the virtual door owner.

In other embodiments, a virtual door controller can interface with one or more blockchains to create unique assets or tokens (e.g., an ERC-721 token, an ERC-1155 token, or the like) which represent digital keys associated with the virtual door. For example, a decentralized application or smart contract can be configured to generate a unique, immutable token on a blockchain which points to metadata stored on a distributed filesystem about the digital key, such as an identity of the virtual door, an identity of the owner, a wallet address of the owner, and/or other relevant information. The decentralized application or smart contract can be configured to "mint" or issue the newly-generated token to a specific cryptocurrency wallet address (e.g., a wallet address associated with the user). The smart contract may be configured to prevent the door key from being transferable to other parties (i.e., designating the key for only one user), or can be configured to allow the key to be transferred to another user (e.g., a saleable key).

At block 706, process 700 receives an authenticated request from the user to travel through the virtual door to the destination location. In this example, the request may be authenticated using an authentication service to identify the user. In some embodiments, the request can be authenticated by including a token, key, or other data within the payload of the request. In blockchain-based NFT door key implementations, the request may also be authenticated by the user's provision of a blockchain wallet address, public key, and/or other identifying information to confirm that the user is the owner of the wallet. In these instances, the user's authentication can be used to verify that they are the owner of an NFT-based door key. Thus, process 700 can verify the identity of the user, and compare that identity against the owner of the NFT to determine whether or not to authorize the request at block 714. As a specific example, the user's device may include a plugin connected to their cryptocurrency wallet, which allows other applications such as the XR universe application to confirm the user's identity and obtain the publicly-available information about the contents of their wallet.

At block 708, process 700 determines whether the virtual door is locked. If the door is locked, process 700 can proceed to block 710 and deny the request to use the virtual door. Blocks 708, 710, and 712 may be similar to or the same as blocks 608, 610, and 612, respectively, as described above with respect to FIG. 6.

If the virtual door is not locked, process 700 proceeds to block 714, where process 700 determines whether the door key and the user are verified and authenticated. As described above, process 700 may compare the user's authenticated identity against a stored list or registry of door keys issued by a virtual controller, or may verify the ownership of an NFT-based virtual door key.

If the user and door key cannot be verified and authenticated, process 700 proceeds to block 716. At block 716, process 700 can deny the request to use the virtual door. Block 716 maybe similar to or the same as block 710. Then, at block 718, process 718 may notify the user that the request to access the owner's virtual door was denied. In some implementations, the notification may inform the user of the reason for the denial, such as a lack of satisfactory authentication (i.e., could not identify the user), an invalid door key, a blocked or deleted door key, and/or because the identified user is not the owner of the door key.

If the user and door key are verified and authenticated, process 700 can proceed to block 720, where process 700 moves the use's avatar to the destination location. Block 720 may be similar to block 516 as described above with respect to FIG. 5.

Figure 8A:
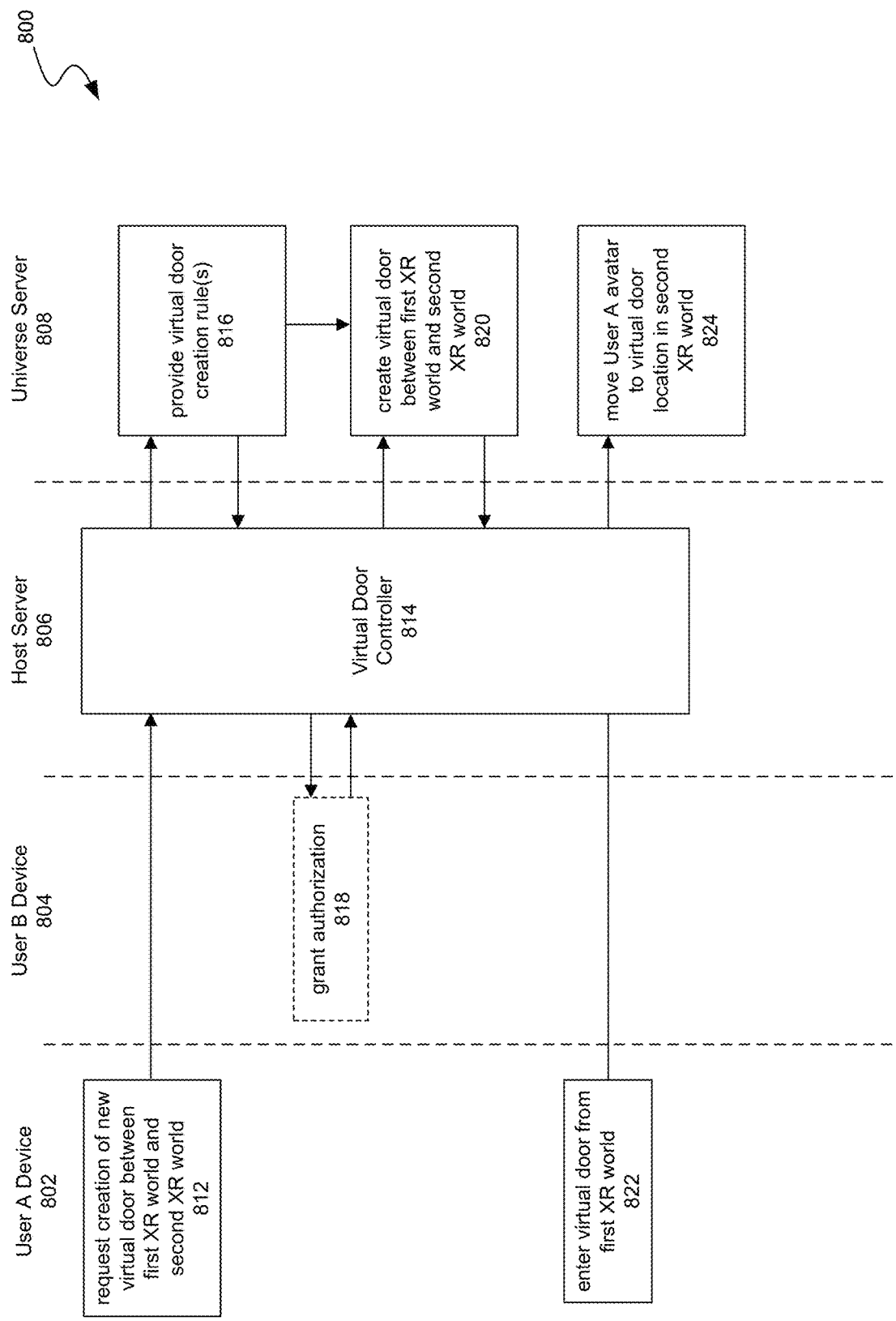
FIG. 8A is a flow diagram illustrating a process used in some implementations of the present technology for authorizing the creation of a virtual door between a first XR world and a second XR world.

FIG. 8A is a flow diagram illustrating a process 800 used in some implementations of the present technology for authorizing the creation of a virtual door between a first XR world and a second XR world. Process 800 may be similar to process 500 as shown and described with respect to FIG. 5. Process 800 can be performed by user A device 802 (e.g., operated by a visitor to the first XR world), user B device 804 (e.g., an owner or administrator of the first XR world), a host server 806, and universe server 808. User A device 802 and user B device 804 can be any suitable XR device or component of an XR system, such as an HMD (e.g., HMD 200 of FIG. 2A or HMD 250 of FIG. 2B), and/or a separate processing component associated with an HMD. Host server 806 can be a standard remotely accessible web server that hosts websites and/or other web-based data, services, and applications, or a locally-executed server, service, or application running in a web browser, virtual machine, or operating system. Universe server 808 can be a server hosting the universe and related data called by user A device 802 and user B device 804.

As shown in FIG. 8A, at block 812, user A device 802 can make a request to virtual door controller 814 running on host server 806 to create of a new virtual door in the first XR world owned and/or maintained by User B that links to a second XR world. Virtual door controller 814 can communicate with universe server 808 to retrieve virtual door creation rules at block 816 (e.g., user permissions, user privacy preferences, a virtual door creation policy, virtual door access policy, etc.). Virtual door controller 814 can then process the request against the virtual door creation rule(s) to determine whether any of the rule(s) are violated by the request. In some cases, such as where the virtual door creation rule(s) include a rule that requires the owner's explicit approval to create new virtual doors, virtual door controller 814 may transmit a request to and receive a response from user B device 804 to grant authorization to user A's request to create a new virtual door in the first XR world. If the rule(s) have been satisfied, virtual door controller 814 proceeds to block 820.

At block 820, virtual door controller 814 can communicate with universe server 808 to create a virtual door between the first and second XR worlds. Information about the virtual door (e.g., its location within the first XR world, its location within the second XR world (if it is instantiated within the second XR world), access permissions, graphical information, etc.) may be returned by universe server 808 back to virtual controller 814 (i.e., to store the metadata to facilitate virtual door intra-universe traversal operations).

Then, at block 822, user A device 802 controls user A's avatar to enter the virtual door that was created within the first XR world and which links to the second XR world. In some implementations, the act of moving through or interacting with a virtual door triggers the virtual door controller 814 to perform the intra-universe traversal of user A's avatar to the second XR world at block 824. In other implementations, the virtual door controller 814 may instruct the universe server 808 to create new virtual objects that are stored by universe server 808 with appropriate metadata to facilitate intra-universe traversals without subsequent intervention by virtual door controller 814.

Figure 8B:
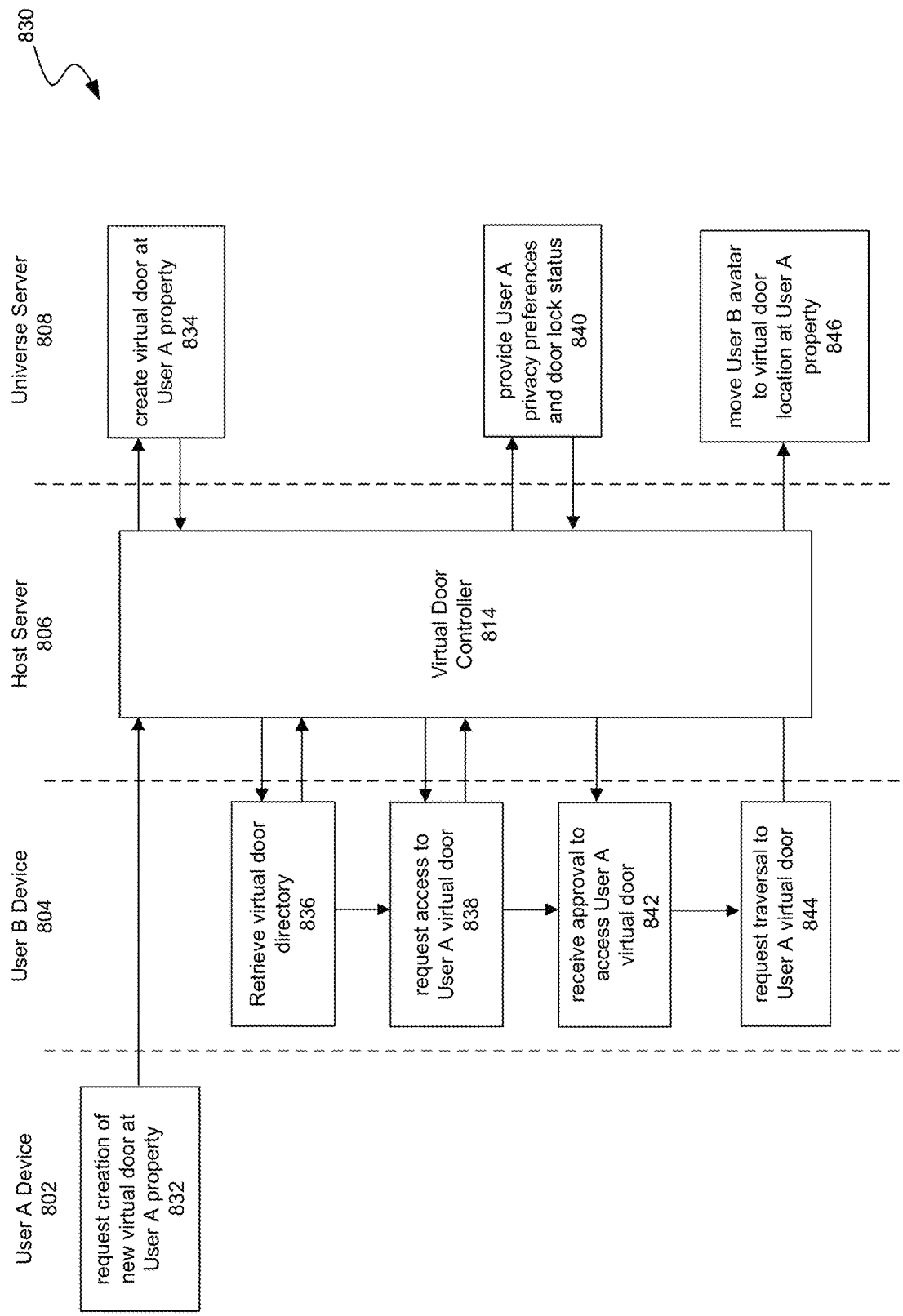
FIG. 8B is a flow diagram illustrating a process used in some implementations of the present technology for user discovery of and traversal through a virtual door in an XR universe.

FIG. 8B is a flow diagram illustrating a process 830 used in some implementations of the present technology for user discovery of and traversal through a virtual door in an XR universe. Process 830 may be similar to process 600 as shown and described with respect to FIG. 6. Process 830 can be performed by user A device 802, user B device 804, a host server 806, and universe server 808.

As shown in FIG. 8B, at block 832, user A device 802 can make a request to create a new virtual door at their own virtual property within an XR universe to virtual door controller 814. In response, at block 834, virtual door controller 814 can interface with universe server 808 to create the virtual door at User A's property (e.g., at a location manually specified by User A, and a preconfigured location for virtual doors such as a gateway room or hub within User A's property, etc.). In some cases, virtual door controller 814 can publish the existence of the virtual door to a database, list, or other data store that is accessible to other users for the purposes of locating virtual doors to travel to.

Then, user B device 804 can access a virtual door directory at block 836, which includes a listing of the virtual door at User A's property. User B device 804 can then request to access the virtual door linked to User A's property at block 838 (e.g., create a virtual door at User B's property that directly links to the virtual door at User A's property). In this example, User A previously configured their privacy preferences to allow other users to access their virtual door and left the door unlocked. Thus, at block 840, virtual door controller 814 determines that the request by User B is automatically approved based on User A's privacy preferences, and transmits that approval to User B at block 842.

In some implementations, virtual door controller 814 may instantiate a virtual door near User B's location which directly links to User A's virtual door. Accordingly, when User B requests to traverse through the virtual door to User A's property at block 844, virtual door controller 814 can instruct universe server 808 to cause User B's avatar to traverse from its current location to a location at or near the virtual door on User A's property. Depending on the particular implementation, virtual door controller 814 may or may not act as an intermediary to facilitate the traversal, such as in cases where the virtual doors are created as assets stored and maintained by universe server 808 and which implement intra-universe traversal function(s) separately from virtual door controller 814.

Figure 8C:
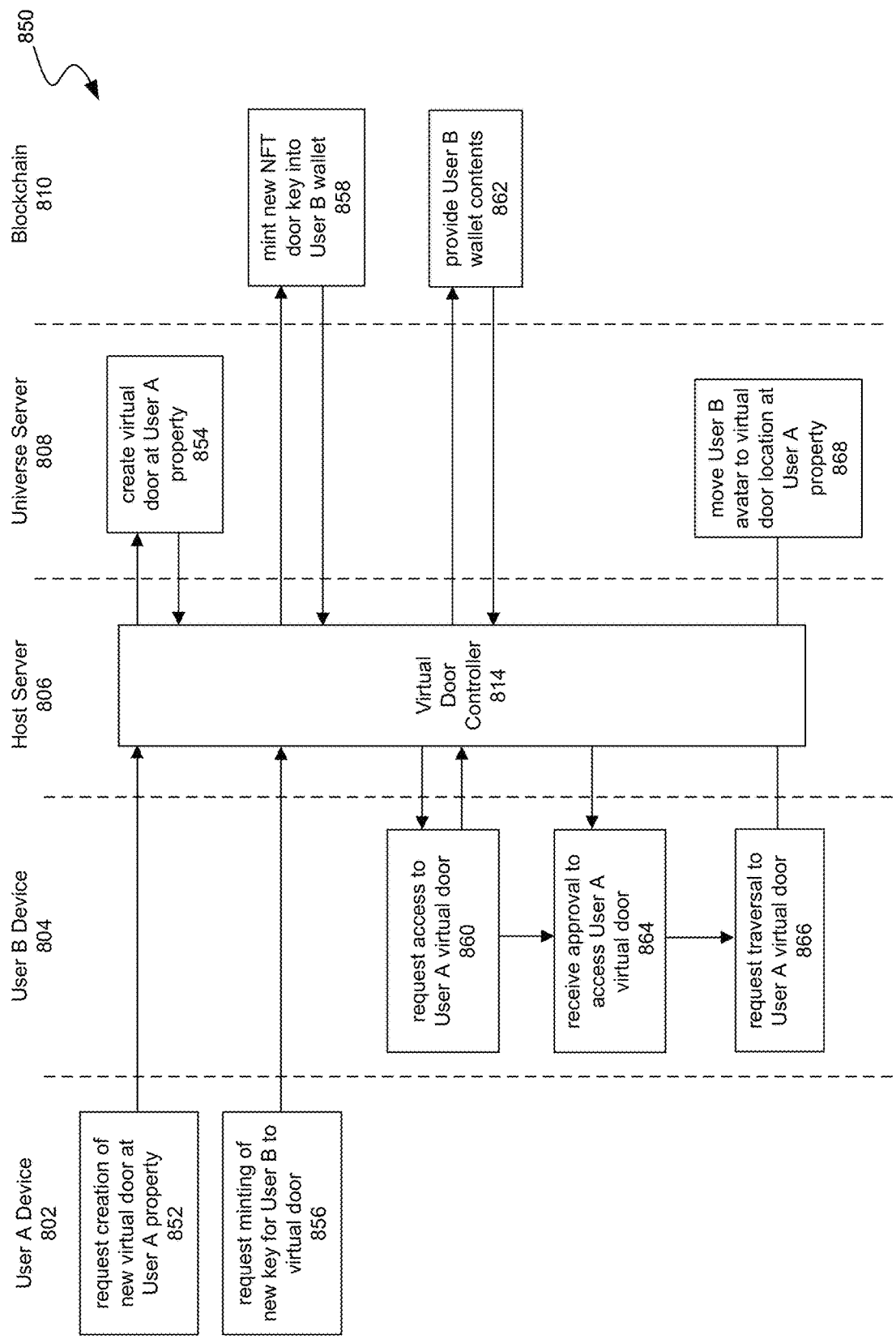
FIG. 8C is a flow diagram illustrating a process used in some implementations of the present technology for creating blockchain-based door keys to facilitate user access control of a virtual door in an XR universe.

FIG. 8C is a flow diagram illustrating a process 850 used in some implementations of the present technology for creating blockchain-based door keys to facilitate user access control of a virtual door in an XR universe. Process 850 may be similar to process 700 as shown and described with respect to FIG. 7. Process 850 can be performed by user A device 802, user B device 804, a host server 806, universe server 808, and blockchain 810.

As shown in FIG. 8C, at block 852, user A device 802 can make a request to create a new virtual door at their own virtual property within an XR universe—a request which is granted by virtual door controller 814 and universe server 808 at block 854. After the virtual door is created, User A can make a request to virtual door controller 814 to mint a new door key for User B on blockchain 810 at block 856. In response, at block 858, virtual door controller 814 interacts with blockchain 810 to mint a new NFT door key into a cryptocurrency wallet associated with User B. In some cases, virtual door controller 814 may store records of the blockchain transaction (e.g., the transaction hash, the destination wallet address, information about the request, information about User A and/or User B, etc.) to enable User A to review previously-issued door keys.

Then, at block 860, User B makes a request to virtual door controller 814 to access the virtual door to User A's property, which may include information about their identity and/or cryptocurrency wallet to verify User B's ownership of the NFT door key. In response, at block 862, virtual door controller 814 can access blockchain 810 to verify the ownership of the NFT door key. Once User B's ownership of the door key is verified, virtual door controller 814 can transmit an approval message to user B device 804 at block 864.

In some implementations, virtual door controller 814 may instantiate a virtual door near User B's location which directly links to User A's virtual door. Then, when User B requests to traverse through the virtual door to User A's property at block 866, virtual door controller 814 can instruct universe server 808 to cause User B's avatar to traverse from its current location to a location at or near the virtual door on User A's property. As with other example implementations described herein, virtual door controller 814 may or may not act as an intermediary to facilitate the traversal.

Figure 9A:
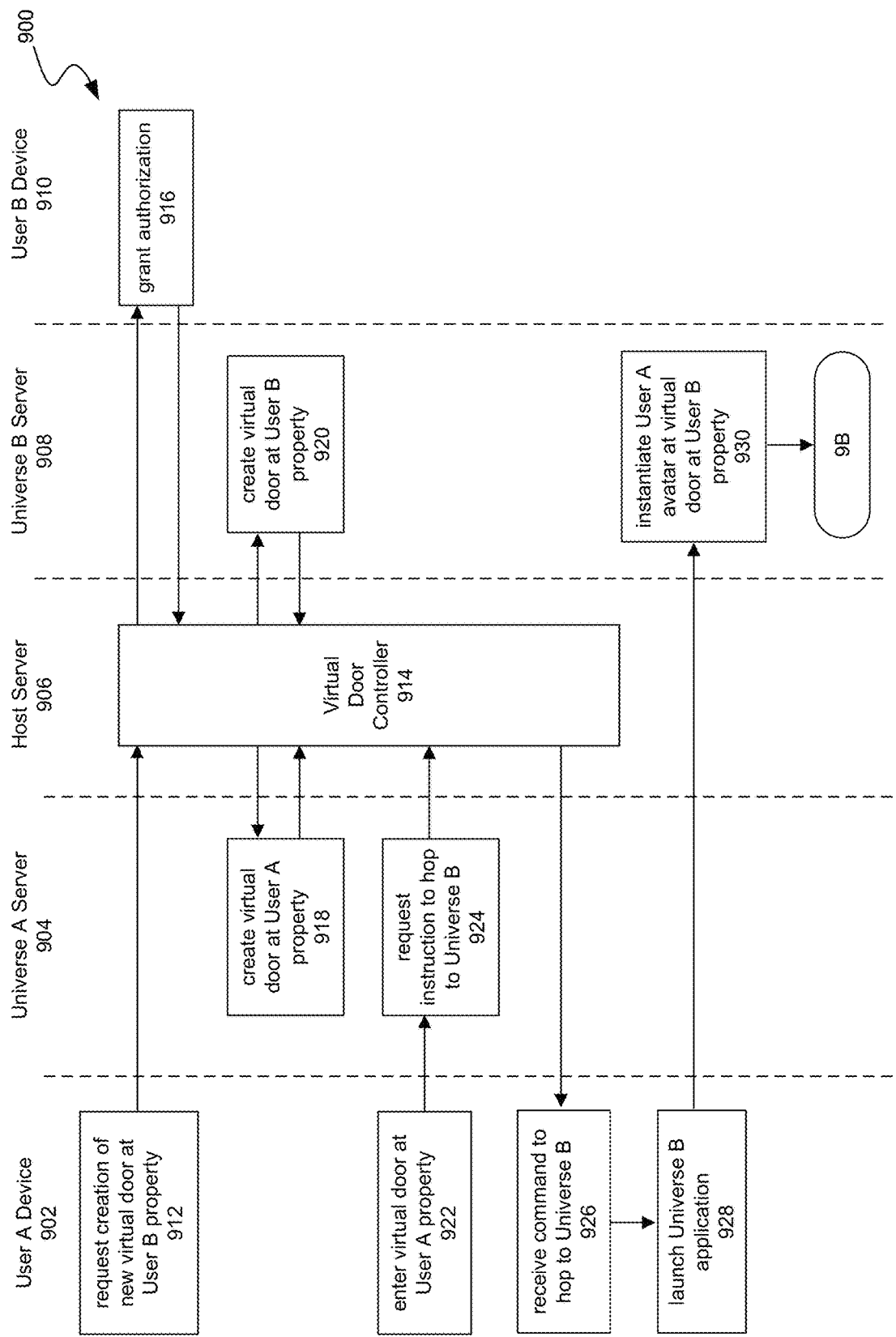
FIGS. 9A and 9B are flow diagrams illustrating a process used in some implementations of the present technology for creating and accessing virtual doors connecting locations in different XR universes or experiences.
Figure 9B:
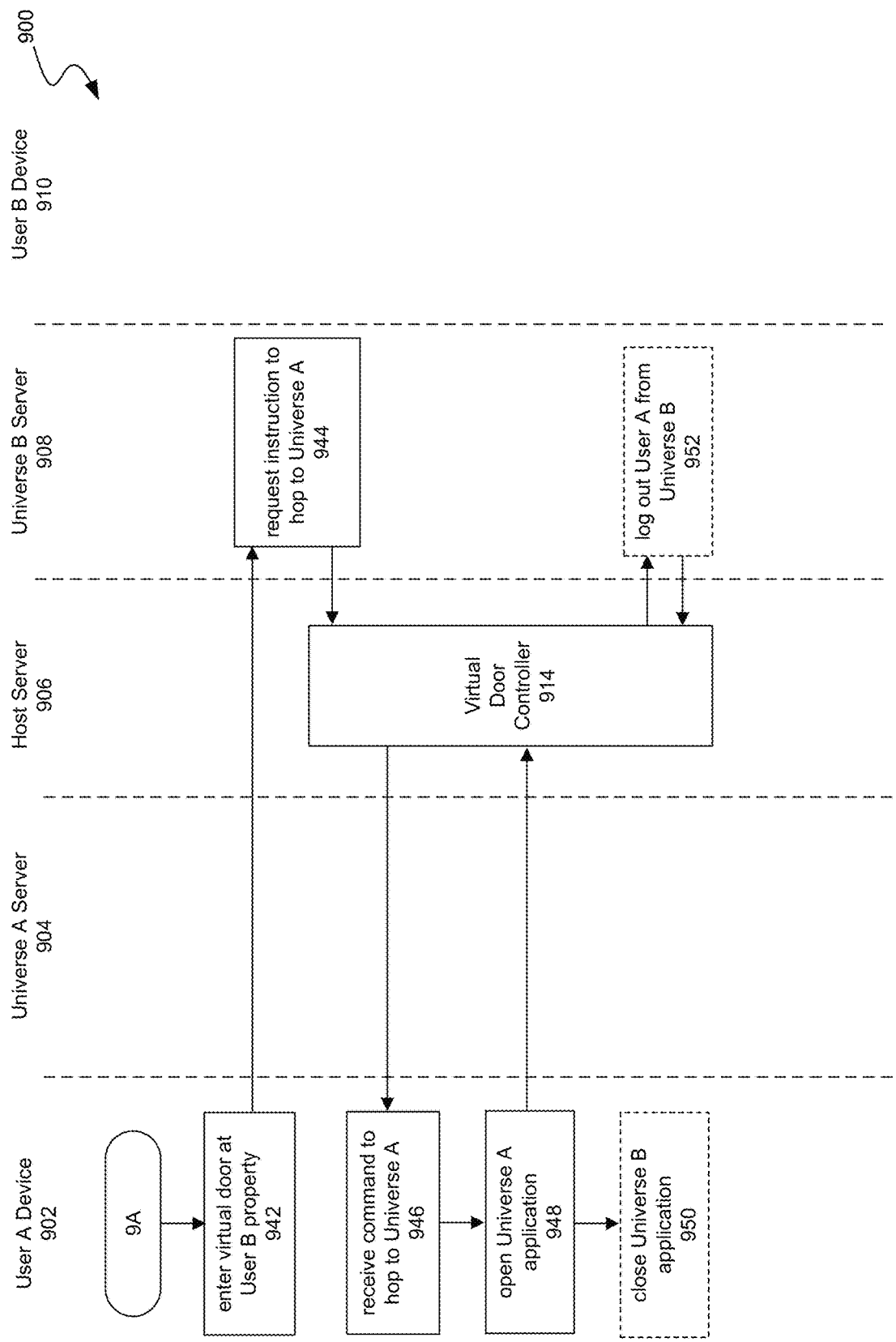

FIGS. 9A and 9B are flow diagrams illustrating a process 900 used in some implementations of the present technology for creating and accessing virtual doors connecting locations in different XR universes (i.e., inter-universe traversal). Process 900 can be performed by user A device 902, universe A server 904, a host server 906, universe B server 908, and user B device 910.

At block 912, user A device 902 makes a request to create a new virtual door at User B's property to virtual controller 914. In response, virtual door controller 914 makes a subsequent request to user B device 910 at block 916 to obtain User B's authorization to create the new virtual door. If User B authorizes the request, virtual door controller 914 can interface with universe A server 904 to create a virtual door at User A's property at block 918, and with universe B server 908 to create a virtual door at User B's property. In some implementations, universe A server 904 and universe B server 908 each respectively store in-universe assets representing the virtual door (e.g., 2D or 3D models, textures, metadata, etc.). In other cases, virtual door controller 914 may store the virtual door locations in Universe A and Universe B, respectively, and interface with user A device 902 and user B device 910 to perform composite graphical rendering to superimpose graphical objects representing the virtual doors from the perspectives of user A device 902 and user B device 910, respectively.

At block 922, User A controls their avatar in Universe A to enter the virtual door created at block 918. By interacting with the virtual door, universe A server 904 can initiate a request to the virtual door controller 914 to "hop" to Universe B at block 924. For example, universe A server 904 can create an asset, artifact, or other virtual object that is linked to the virtual door controller 914—such that virtual door controller 914 acts as middleware or an XR universe router facilitate the transition from Universe A to Universe B. In other implementations, user A device 902 can interact directly with host server 906 when accessing the virtual door (e.g., if virtual door controller is a separate application that creates and renders virtual doors independently from Universe A).

Regardless of the particular implementation, user A device 902 can receive a command, instruction, or other message to facilitate the traversal to Universe B at block 926. For instance, virtual door controller 914 can provide instructions, commands, URL(s), and/or information that enables user A device 902 to transition between XR universe applications. Additional details about techniques for transitioning between XR universe applications is shown and described in more detail with respect to FIGS. 10A-10C.

At block 928, user A device 902 launches an XR universe application that connects to Universe B (e.g., a web browser directed to a particular URL, an application executable by the OS of user A device 902, etc.). The operations of block 928 may involve passing arguments, parameters, or other data to universe B server 908 to facilitate logging in User A into Universe B and instantiating User A's avatar in Universe B at or near the virtual door of User B's property created at block 920. In some embodiments, blocks 928 and 930 may be performed substantially in the background of user A device 902, such that User A experiences a smooth transition between XR universe applications.

After User A has explored Universe B, they may wish to return back to their property in Universe A. As shown in FIG. 9B, at block 942, User A can control their avatar in Universe B to enter the virtual door created at block 920. By interacting with the virtual door, universe B server 908 (or user B device 910) can initiate a request to the virtual door controller 914 to "hop" back to Universe A at block 944. In response, virtual door controller 914 can provide instruction(s) and/or command(s) that, upon execution by user A device 902, causes user A device 902 to either context switch back to the XR universe application for Universe A (if the XR universe application for Universe A is still running), or to re-open or launch the XR application for Universe A (if the XR universe application for Universe A was exited or closed after switching to Universe B).

At block 948, user A device 902 opens the XR universe application for Universe A. In some cases, user A device 902 can inform virtual door controller 914 that User A has returned back to Universe A. In response, virtual door controller 914 may cause User A to be logged out and/or de-initialized from universe B server at block 952. In addition, user A device 902 may close the XR application for Universe B after returning to Universe A at block 950 (e.g., to prevent excess load on the computing resources of user A device 902). In this manner, host server 906 can facilitate transitioning user A device between XR universe applications in a manner that gives the impression to User A that they are traversing between XR universes, which may each be backed by different servers, have different avatars and/or art styles, and which may require different applications or web browser instances to access them.

Figure 10A:
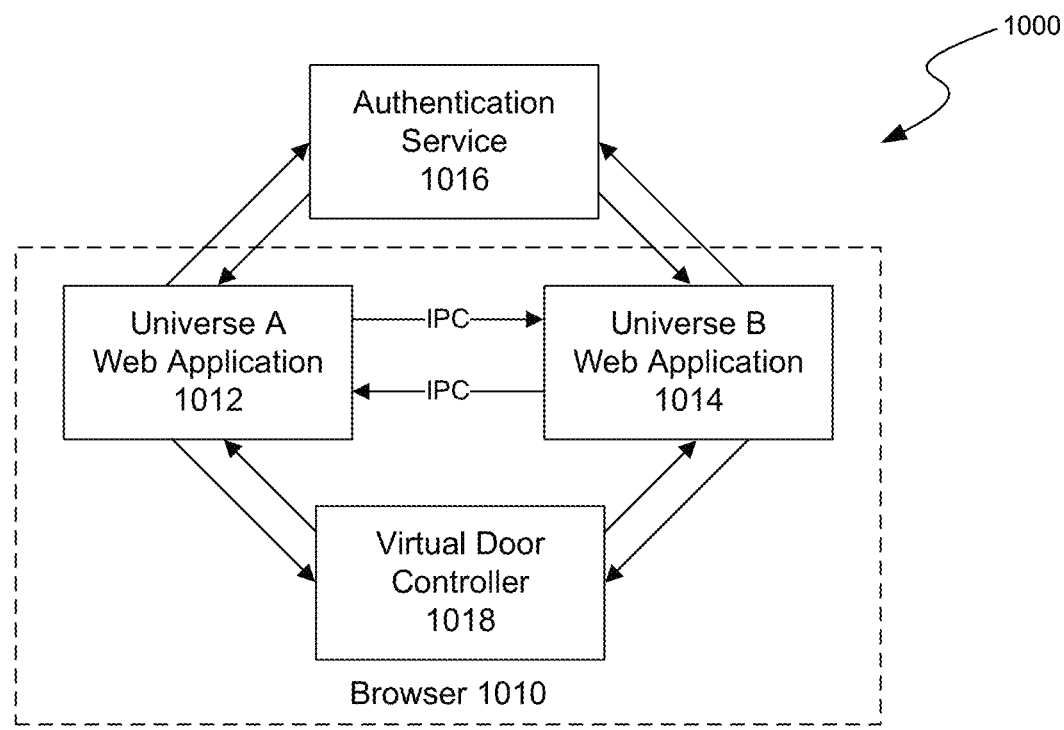
FIGS. 10A, 10B, and 10C are conceptual diagrams illustrating example architectures for enabling inter-universe interoperability to facilitate in-universe traversal across different XR universes or experiences.
Figure 10B:
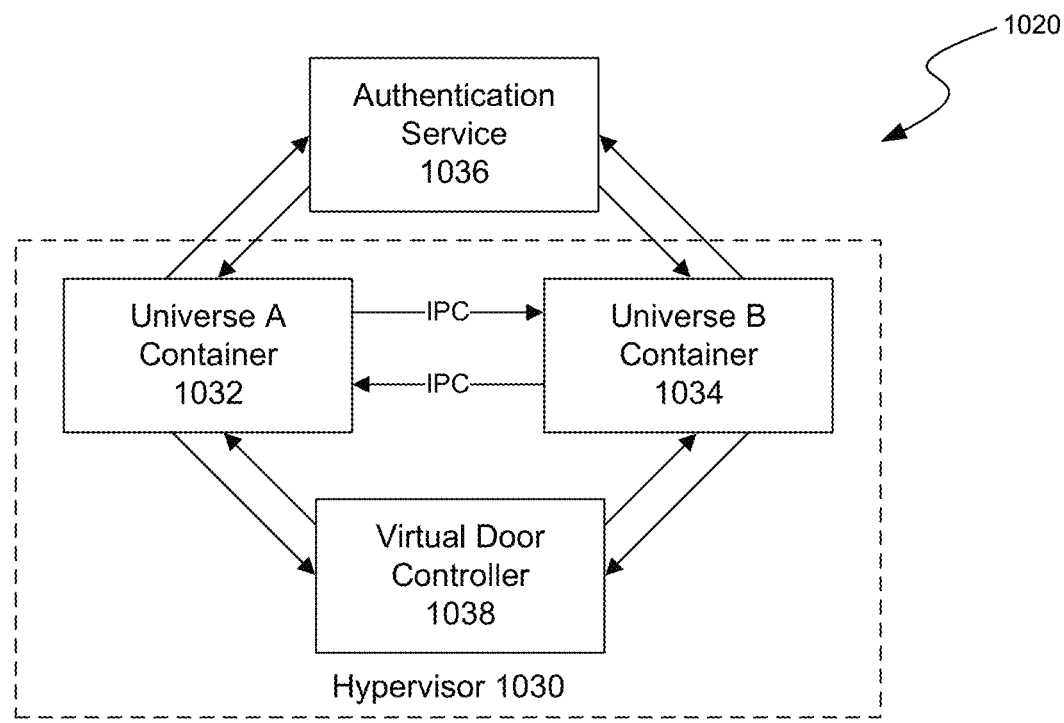
Figure 10C:
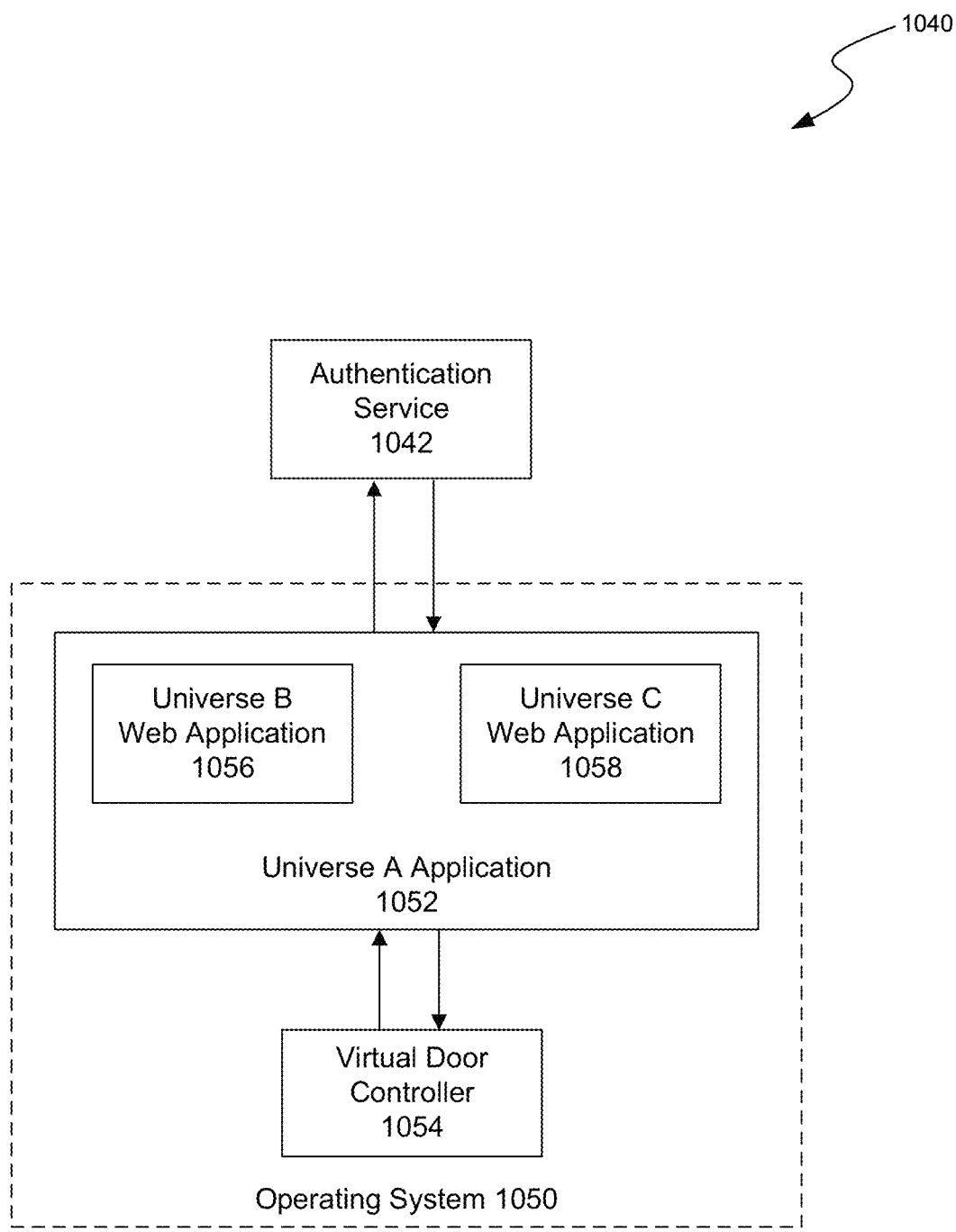

FIGS. 10A, 10B, and 10C are conceptual diagrams 1000, 1020, and 1040, respectively, illustrating example architectures for enabling inter-universe interoperability to facilitate in-universe traversal across different XR universes. As shown in FIG. 10A, a web browser 1010 can serve as an execution environment to run web clients that implement universe A web application 1012, universe B web application 1014, and virtual door controller 1018. In addition, an external authentication service (which may be running on an external server) can be accessed by various applications running in web browser 1010 to facilitate user authentication (e.g., single sign-on (SSO) authorization, which can provide the authenticate a user's identity across multiple applications simultaneously).

Universe A web application 1012 and universe B web application 1014 may be adapted to engage in IPC on the client side and/or across the Internet (e.g., via WebSockets or the like). Interoperable communication between universe A web application 1012 and universe B web application 1014 can allow one of the applications to share information to create immersive transitions between the two applications, such as the avatar's position, orientation, camera angle, inputs from peripherals, controllers, and/or VR headsets, graphical settings (e.g., resolution, window size, etc.), and/or any other information that generically represents the state of an XR application. As a result, a user within universe A web application 1012 can look through a virtual door into universe B web application 1014, with the shared information synchronizing the camera angle and field of view in both XR universes to give the impression that the two applications are operating as one.

In some implementations, virtual door controller 1018 may provide a canvas within browser 1010 that both universe A web application 1012 and universe B web application 1014 can render graphics to, thereby enabling the two applications to be composited on the same canvas (e.g., such that the user does not have to switch to a different web browser or experience a jarring context switch). Additionally and/or alternatively, virtual door controller 1018 can overlay, composite, or otherwise alter the canvas of universe A web application to graphically render additional objects' UIs, such as virtual doors, for creating and managing virtual doors, and/or other objects.

In some embodiments, universe A web application 1012 and universe B web application 1014 can each interface with an external authentication service 1016. Although a user signed in to Universe A may have a different account with Universe B, authentication service 1016 can enable SSO, which allows the user to be conveniently signed into universe A web application 1012 and universe B web application 1014 on the fly—thereby enabling virtual door controller 1018 to launch new universe web applications and sign the user into that new XR universe, without requiring the user to manually log in to the new XR universe application.

FIG. 10B illustrates a similar architecture as shown in FIG. 10A. However, in FIG. 10B, a hypervisor 1030 running on a device's operating system can manage the starting, execution, and stopping of different applications (e.g., a system and service manager, containerized application and virtualization manager, etc.). In this example, Universe A container 1032 and Universe B container 1034 may execute software that is substantially compiled for native execution by the device's operating system. However, as with the example of FIG. 10A, Universe A container 1032 and Universe B container 1034 can communicate with each other via IPC, similar to the example of FIG. 10A. Likewise, hypervisor 1030 can execute a virtual door controller 1038 that communicates with both Universe A container 1032 and Universe B container 1034 to facilitate the creation and operation of virtual doors that connect locations between Universe A and Universe B. In addition, an authentication service 1036 can be accessed by various services or applications maintained by hypervisor 1030, to facilitate user authentication in each XR universe application container.

In some implementations, hypervisor 1030 may provide tools (e.g., an API, CLI, etc.) that can be used by virtual door controller 1038 to start and stop XR universe application containers—thereby enabling virtual door controller 1038 to automatically start new XR universe applications without manual intervention by the user. In addition, virtual door controller 1038 may be adapted to access external resources and/or libraries to download containers for new XR universes that the user has not previously accessed. In this manner, the techniques of the present disclosure can be performed on an OS level to enable in-application traversal across XR universes.

FIG. 10C illustrates a similar architecture as shown in FIG. 10A. However, in FIG. 10C, Universe A application 1052 can act as a host or environment within which other XR universe applications can be executed. For example, Universe A application 1052 may be a native application that is executed directly by operating system 1050 of a user's device. Universe A application 1052 can implement in-application web browsers capable of rendering 3D graphics and passing through inputs from Universe A application 1052 into those web browser sessions. In an example operation, a user within Universe A can instantiate a new in-application web browser that launches Universe B web application 1056 and/or universe C web application 1058 (e.g., with the URLs and/or data payloads being determined by virtual door controller 1054). The user within Universe A can interact with the web browser to "enter" the 3D environment of Universe B or Universe C (i.e., a virtual 3D analog to opening a web browser and entering a full screen or kiosk mode). In doing so, the user can effectively traverse between XR universes.

In some cases, virtual door controller 1054 can supply graphical assets, textures, and/or other information to Universe A application 1052 to render the in-application browser as a door, elevator, portal, or another object other than a 2D surface reminiscent of a web browser. By "re-skinning" the browser as a doorway or portal, a more immersive experience can be created that gives the impression of traversing through the metaverse.

Figure 11:
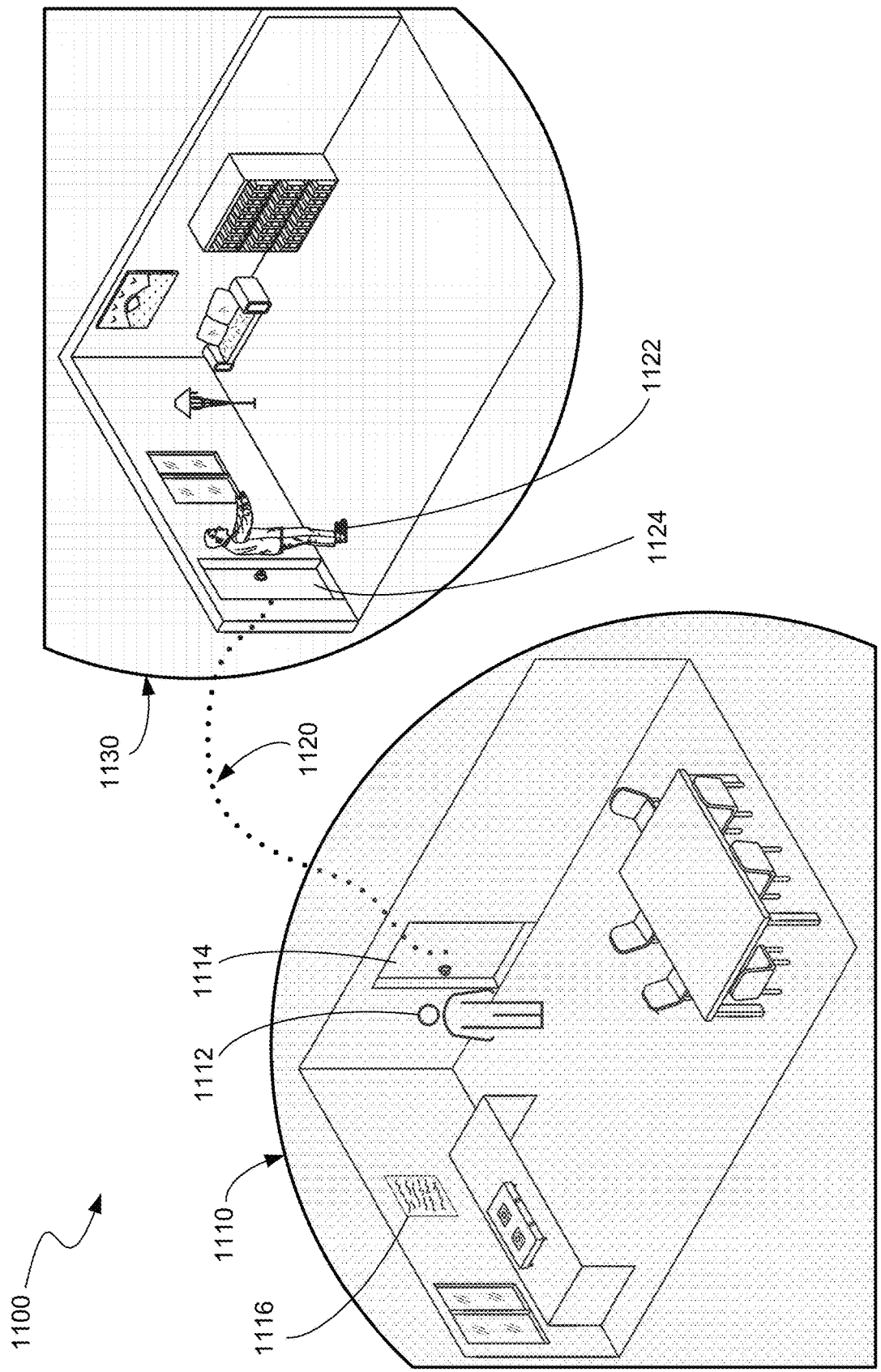
FIG. 11 is a conceptual diagram illustrating an example traversal through a virtual door connecting different XR universes or experiences.

FIG. 11 is a conceptual diagram 1100 illustrating an example traversal through a virtual door connecting different XR universes. In this example, an avatar 1112 in XR universe 1110 instructs a virtual door controller to create a virtual door 1114 that connects to a corresponding virtual door 1124 in XR universe 1130. When the avatar 1112 interacts with or moves through the virtual door 1114, the user is logged in to XR universe 1130 and their avatar within that XR universe is instantiated near the virtual door 1124. In this manner, the user has, in effect, traversed across different XR universes.

In this example, XR universe 1110 and XR universe 1130 have different artistic styles. As a result, the user's avatar 1112 in XR universe 1110 has a different appearance to the user's avatar 1122 in XR universe 1130. Thus, the user's avatar may not necessarily traverse through the metaverse, but instead the same user may experience a switch from their current avatar to their avatar in the destination XR universe.

In addition, a directory of virtual doors 1116 in XR universe 1110 and/or XR universe 1130 may be accessible to users within the XR universe 1110. The user may view the directory of virtual doors 1116 to discover new places to visit and/or find virtual doors that connect to their friends or users they follow.

FIG. 12 is a conceptual diagram 1200 illustrating an example user interface (UI) for managing virtual doors. As shown in FIG. 12, a virtual interface may be created within an XR universe application which enables users to review their privacy preferences (e.g., user privacy preferences 448), manage door keys, lock existing doors, unlock existing doors, review and/or update their allow list(s) and block list(s), and/or create new virtual doors. In some implementations, the user privacy interface may be a web page hosted by a virtual door controller that is rendered in a virtual browser within an XR application. In some cases, the user privacy preferences may be implemented by an XR application itself. Regardless of the particular implementation, the virtual management interface can enable users to manage their virtual door privacy preferences without having to exit the metaverse.

Reference in this specification to "implementations" (e.g., "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle-specified number of items, or that an item under comparison has a value within a middle-specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method for creating virtual doors for user traversal across one or more artificial reality (XR) worlds, the method comprising:

receiving, at a computing system, a first request from a first user to create a new first virtual door within a first XR world, that will create a new link between the first XR world and a second XR world;

obtaining one or more rules that define restrictions on creating virtual doors in the first XR world, the restrictions defining one or more of who can create virtual doors that create a new link or where virtual doors that create a new link from the first world can lead, wherein virtual doors can be created by users if the one or more rules are satisfied;

determining that the one or more rules are satisfied based on at least one of the first user or the second XR world in relation to the restrictions defining one or more of who can create virtual doors that create a new link or where virtual doors that create a new link from the first world can lead; and based on the determination that the one or more rules are satisfied, generating the new first virtual door, within the first XR world, including instantiating the new link between the first XR world and the second XR world.

2. The method of claim 1, wherein the one or more rules comprises a first rule, associated with the first XR world, that defines a user allow list specifying users who are allowed to create virtual doors in the first XR world, and wherein determining that the one or more rules are satisfied comprises determining that the user allow list includes the first user.

3. The method of claim 1, wherein the one or more rules comprises a first rule, associated with the first XR world, that defines a user block list specifying users who are not allowed to create virtual doors in the first XR world, and wherein determining that the one or more rules are satisfied comprises determining that the user block list does not include the first user.

4. The method of claim 1, wherein the one or more rules comprises a first rule, associated with the first XR world, that defines a world allow list specifying worlds to which virtual doors are allowed to lead from the first XR world, and wherein determining that the one or more rules are satisfied comprises determining that the world allow list includes the second XR world.

5. The method of claim 1, wherein the one or more rules comprises a first rule, associated with the first XR world, that defines a world block list specifying worlds to which virtual doors are not allowed to lead from the first XR world, and wherein determining that the one or more rules are satisfied comprises determining that the world block list does not include the second XR world.

6. The method of claim 1, wherein the one or more rules comprises a first rule, associated with the first XR world, that specifies a world rating minimum threshold defining a minimum rating a world must have to be linked to from the first XR world, and wherein determining that the one or more rules are satisfied comprises:
 determining a world rating assigned to the second XR world; and
 determining that the one or more rules are satisfied based at least in part on determining that the world rating assigned to the second XR world is above the world rating minimum threshold defining the minimum rating that a world must have to be linked to from the first XR world.

7. The method of claim 1, wherein the one or more rules comprises a first rule, associated with the first XR world, that specifies a world similarity minimum threshold defining a minimum similarity level a world must have to the first XR world to be linked to from the first XR world, and wherein determining that the one or more rules are satisfied comprises:
 determining a similarity score indicative of a degree of similarity between the first XR world and the second XR world; and
 determining that the one or more rules are satisfied based at least in part on determining that the similarity score is above the world similarity minimum threshold defining the minimum similarity level a world must have to the first XR world to be linked to from the first XR world.

8. The method of claim 7, wherein the similarity score is based at least in part on one or more first tags associated with the first XR world and one or more second tags associated with the second XR world.

9. The method of claim 7, wherein the similarity score is based at least in part on a first content type associated with the first XR world and a second content type associated with the second XR world.

10. The method of claim 1, wherein the first XR world and the second XR world are within the same XR universe hosted by an XR universe server system.

11. The method of claim 1, wherein the first XR world is within a first XR universe hosted by a first XR universe server system, and wherein the second XR world is within a second XR universe hosted by a second XR universe server system.

12. A non-transitory computer-readable storage medium storing instructions that, when executed by a computing system, cause the computing system to perform operations for accessing virtual doors for user traversal across one or more artificial reality (XR) worlds, the operations comprising:
 receiving, at a computing system, a first request to create a new first virtual door within a first XR world, that will create a new link between the first XR world and a second XR world;
 obtaining one or more rules that define restrictions on creating virtual doors in the first XR world, the restrictions defining one more of who can create virtual doors that create a new link or where virtual doors that create a new link from the first world can lead, wherein virtual doors can be created if the one or more rules are satisfied;
 determining that the one or more rules are satisfied based on at least one of a first user or the second XR world in relation to the restrictions defining one or more of who can create virtual doors that create a new link or where virtual doors that create a new link from the first world can lead; and
 based on the determination that the one or more rules are satisfied, generating the new first virtual door, within the first XR world, including instantiating the new link between the first XR world and second XR world.

13. The non-transitory computer-readable storage medium of claim 12, wherein the one or more rules comprises a first rule, associated with the first XR world, that defines a user allow list specifying users who are allowed to create virtual doors in the first XR world, and wherein determining that the one or more rules are satisfied comprises determining that the user allow list includes the first user.

14. The non-transitory computer-readable storage medium of claim 12, wherein the one or more rules comprises a first rule, associated with the first XR world, that defines a user block list specifying users who are not allowed to create virtual doors in the first XR world, and wherein determining that the one or more rules are satisfied comprises determining that the user block list does not include the first user.

15. The non-transitory computer-readable storage medium of claim 12, wherein the one or more rules comprises a first rule, associated with the first XR world, that defines a time-of-day restriction, and wherein determining that the one or more rules are satisfied comprises:

determining a current time of day; and determining that the one or more rules are satisfied based at least in part on determining that the current time of day is outside of the time-of-day restriction.

16. A computing system for accessing virtual doors for user traversal across one or more artificial reality (XR) worlds, the computing system comprising:

one or more processors; and one or more memories storing instructions that, when executed by the one or more processors, cause the computing system to perform operations comprising:

receiving, at the computing system, a first request to create a new first virtual door within a first XR world, that will create a new link between the first XR world a second XR world;

obtaining one or more rules that define restrictions on creating virtual doors in the XR world, the restrictions defining one or more of who can create virtual doors that create a new link or where virtual doors that create a new link from the first world can lead, wherein virtual doors can be created if the one or more rules are satisfied;

determining that the one or more rules are satisfied based on at least one of a first user or the second XR world in relation to the restrictions defining one or more of who can create virtual doors that create a new link or where virtual doors that create a new link from the first world can lead; and based on the determination that the one or more rules are satisfied, generating the new first virtual door, within the first XR world, including instantiating the new link between the first XR world and the second XR world.

17. The computing system of claim 16, wherein the one or more rules comprises a first rule, associated with the first XR world, that defines a user allow list specifying users who are allowed to create virtual doors in the first XR world, and wherein determining that the one or more rules are satisfied comprises determining that the user allow list includes the first user.

18. The method of claim 16, wherein the one or more rules comprises a first rule, associated with the first XR world, that defines a world allow list specifying worlds to which virtual doors are allowed to lead from the first XR world, and wherein determining that the one or more rules are satisfied comprises determining that the world allow list includes the second XR world.

19. The method of claim 16, wherein the one or more rules comprises a first rule, associated with the first XR world, that specifies a world rating minimum threshold defining a minimum rating a world must have to be linked to from the first XR world, and wherein determining that the one or more rules are satisfied comprises:

determining a world rating assigned to the second XR world; and determining that the one or more rules are satisfied based at least in part on determining that the world rating assigned to the second XR world is above the world rating minimum threshold defining the minimum rating that a world must have to be linked to from the first XR world.

20. The method of claim 16, wherein the one or more rules comprises a first rule, associated with the first XR world, that specifies a world similarity minimum threshold defining a minimum similarity level a world must have to the first XR world to be linked to from the first XR world, and wherein determining that the one or more rules are satisfied comprises:

determining a similarity score indicative of a degree of similarity between the first XR world and the second XR world; and determining that the one or more rules are satisfied based at least in part on determining that the similarity score is above the world similarity minimum threshold defining the minimum similarity level a world must have to the first XR world to be linked to from the first XR world.

* * * * *